United States Patent [19]

Narita et al.

[11] Patent Number: 5,667,458
[45] Date of Patent: Sep. 16, 1997

[54] LOCK-UP CONTROL APPARATUS FOR AUTOMATIC TRANSMISSION

[75] Inventors: Yasushi Narita, Yokohama; Yasuhiro Niikura, Yokosuka; Noboru Hattori, Yokosuka; Shusaku Katakura, Yokosuka; Hisaaki Tohjima, Yokohama, all of Japan

[73] Assignee: Nissan Motor Co., Ltd., Yokohama, Japan

[21] Appl. No.: 499,258

[22] Filed: Jul. 7, 1995

[30] Foreign Application Priority Data

Jul. 8, 1994 [JP] Japan ............................. 6-157325

[51] Int. Cl.$^6$ ............................................. B60K 41/02
[52] U.S. Cl. ........................... 477/169; 477/62; 477/118
[58] Field of Search ........................... 477/62, 118, 120, 477/169, 176; 192/3.28, 3.3

[56] References Cited

U.S. PATENT DOCUMENTS

| 4,768,635 | 9/1988 | Sakurai et al. ..................... 477/169 |
| 5,325,946 | 7/1994 | Kashiwabara et al. ............... 477/65 |

FOREIGN PATENT DOCUMENTS 4-370465  12/1992  Japan .

OTHER PUBLICATIONS

"Service Manual for Nissan RE4R01A-Type Full-Range Electronically-Controlled Automatic Transmission" Issued by Nissan Motor Co., Ltd. (1987).

*Primary Examiner*—Charles A. Marmor
*Assistant Examiner*—Sherry Lynn Estremsky
*Attorney, Agent, or Firm*—Foley & Lardner

[57] ABSTRACT

A lock-up control apparatus for a vehicle automatic transmission enables an engine stalling prevention at the time of a sudden deceleration in the lock-up state of a torque converter without causing the slip of the torque converter before the sudden deceleration, and prevents effectiveness of the fuel consumption from being sacrificed by a fuel cut. A controller performs the change-speed control on an automatic transmission through shift solenoids and on the basis of a throttle opening and a transmission output speed, and also performs the lock-up control of the torque converter through a lock-up solenoid. During the coasting drive when the throttle opening is set close to zero, the controller sets the torque converter to have a minimum lock-up capacity through the lock-up solenoid within such a range that no slip occurs. When the sudden deceleration is carried out, the controller releases the lock-up, though this lock-up release is rapidly achieved with the minimum lock-up capacity thereby to avoid the engine stalling.

8 Claims, 19 Drawing Sheets

FIG_4

FIG_5

FIG_6

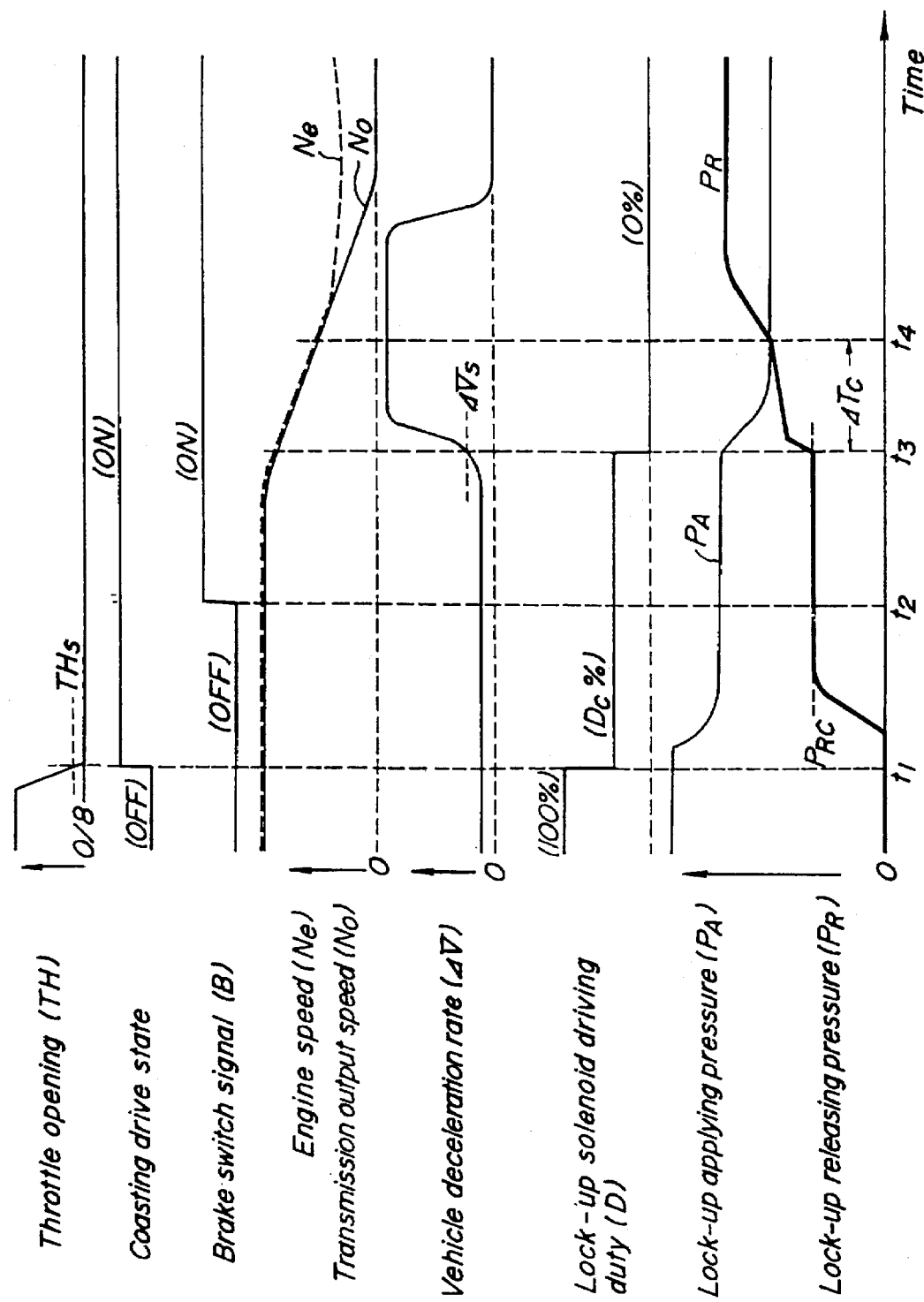
FIG_8

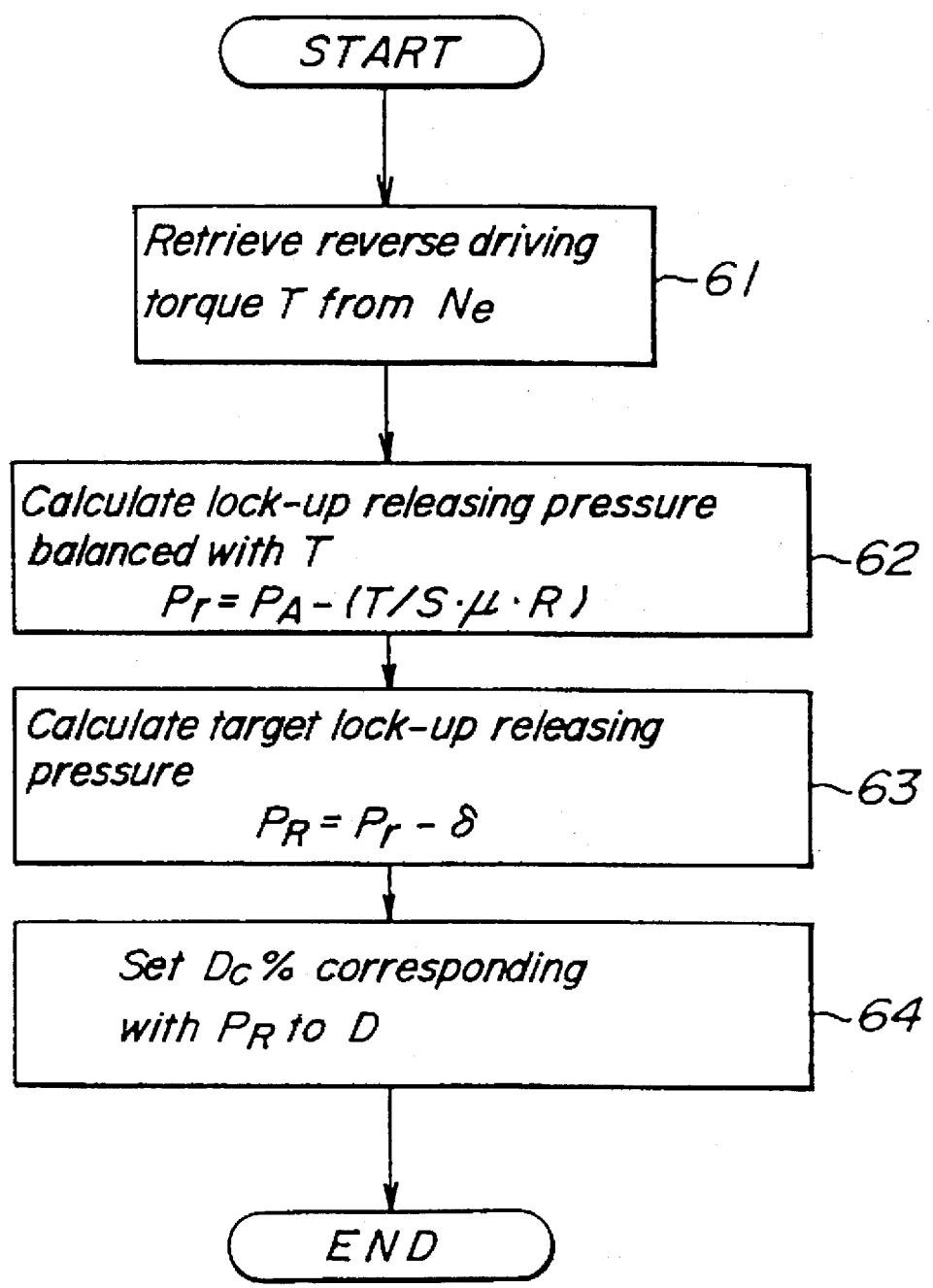

FIG_10
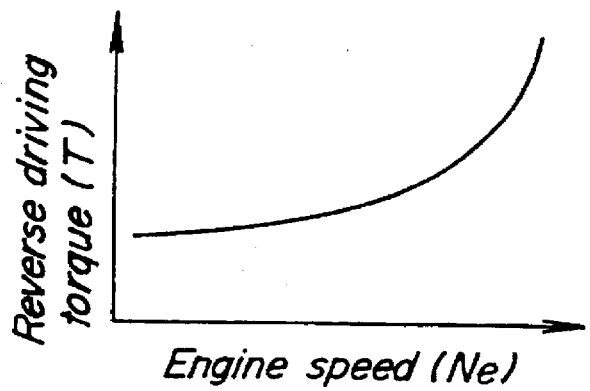
FIG_11
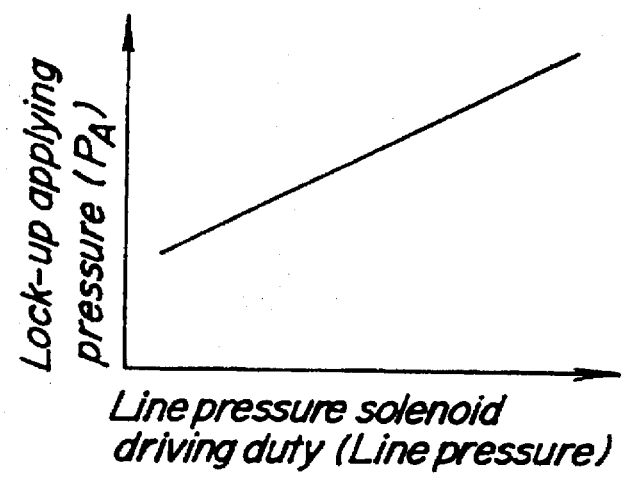
FIG_12
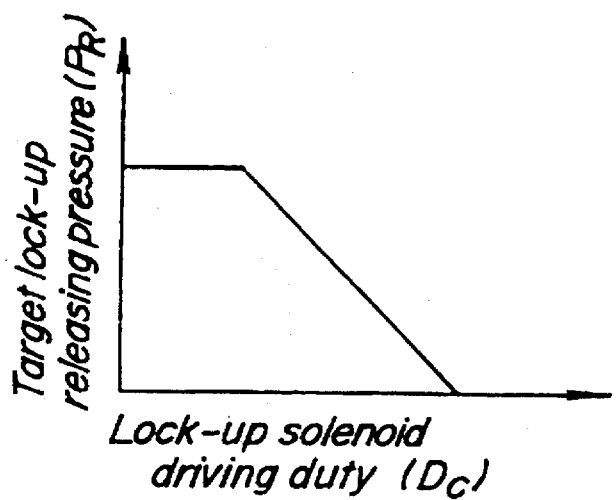

FIG_13
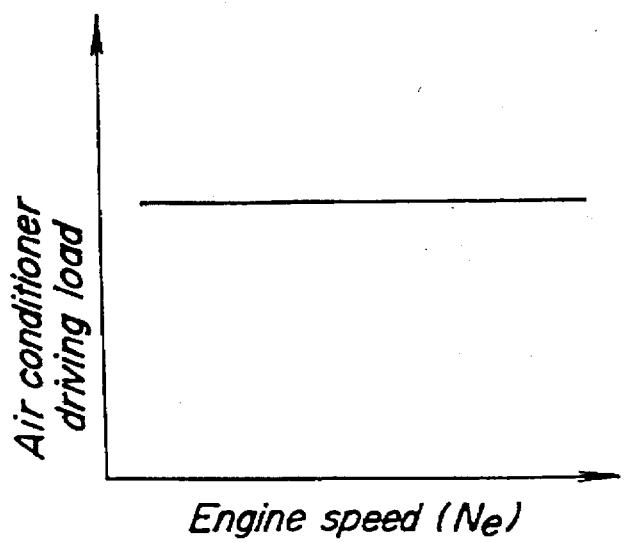
FIG_14
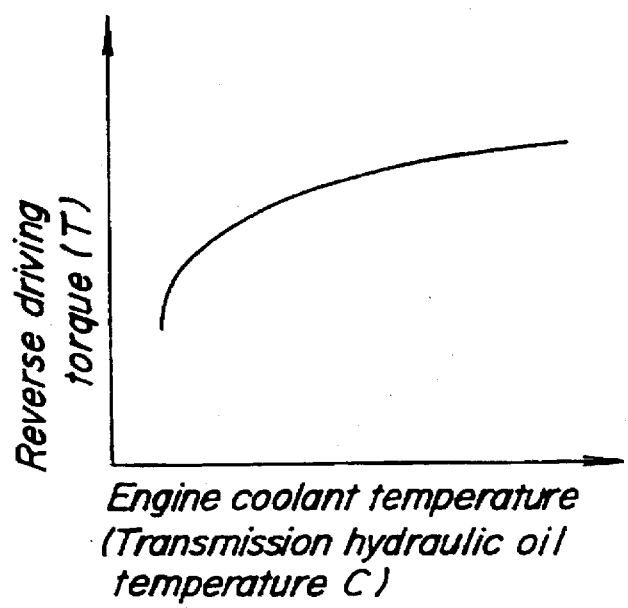

FIG_15
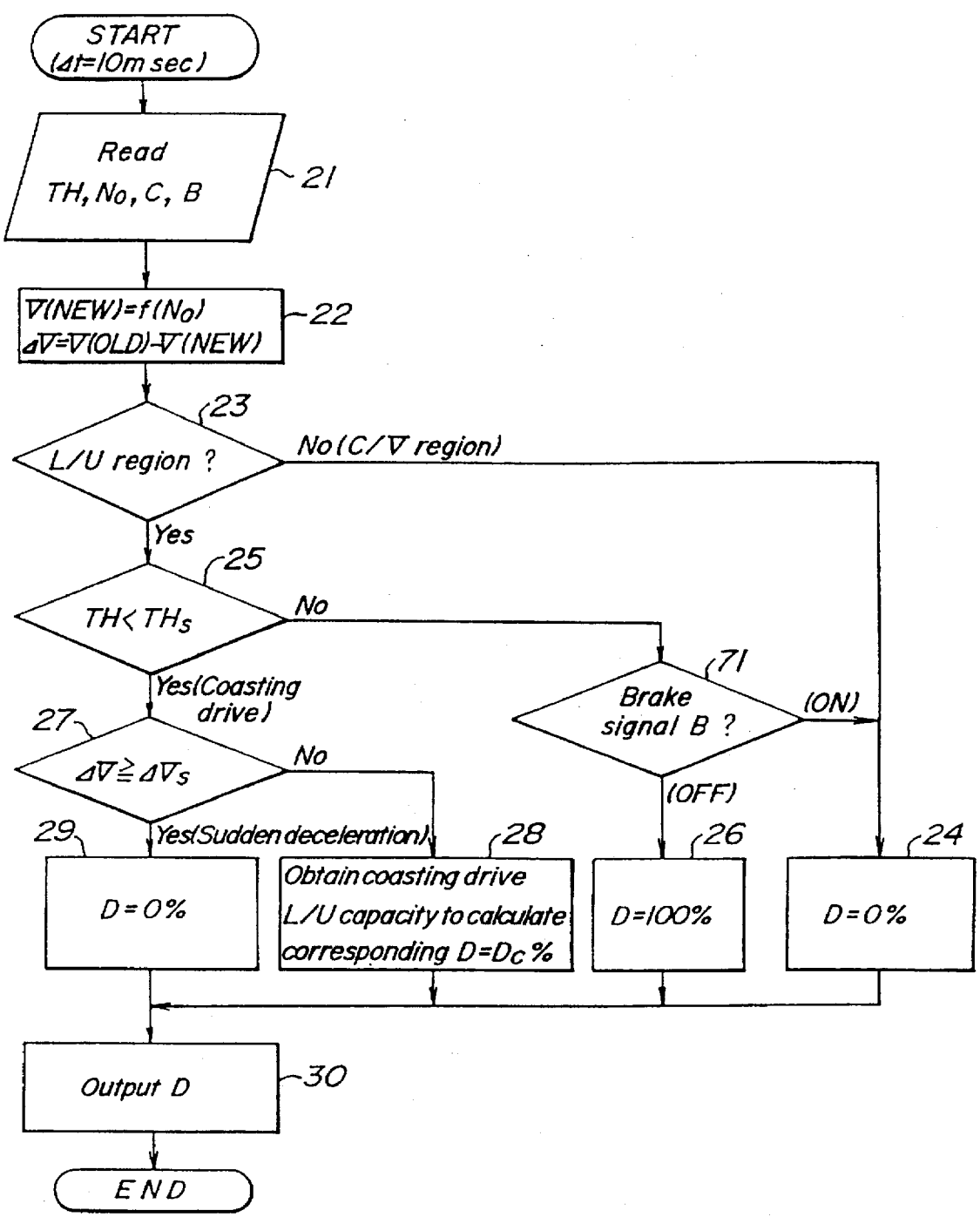

FIG_17

FIG_18

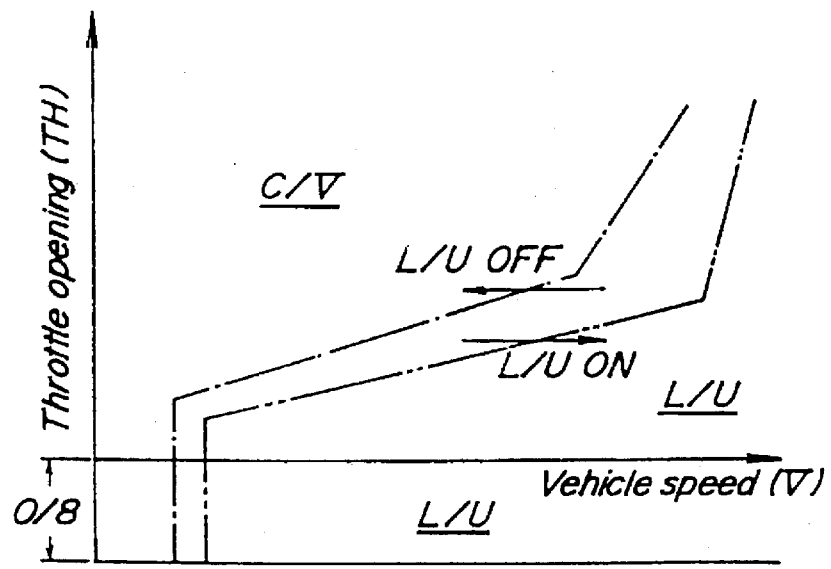
FIG_21
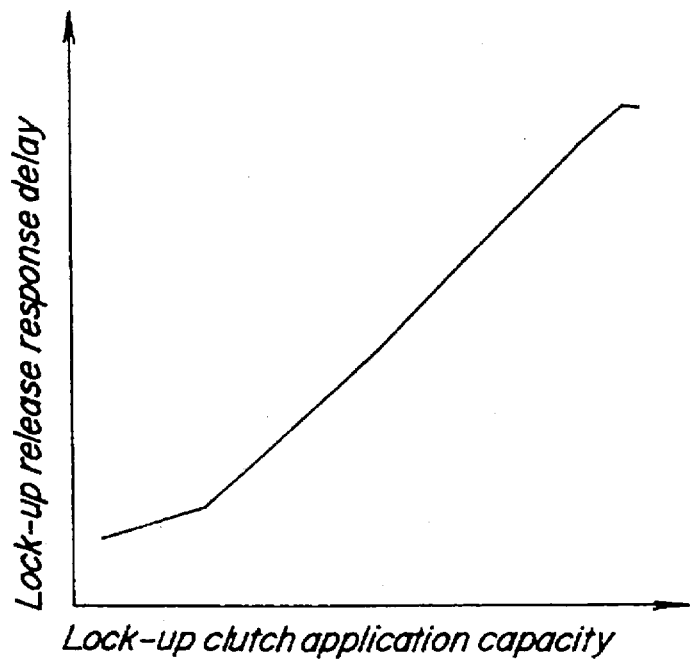
FIG_22

LOCK-UP CONTROL APPARATUS FOR AUTOMATIC TRANSMISSION

BACKGROUND OF THE INVENTION

1. Field of the Invention

The present invention relates to a lock-up control apparatus for an automatic transmission of a vehicle, for controlling a lock-up state of a torque converter wherein its input and output elements are directly connected to each other during a coasting drive including deceleration of the vehicle.

2. Description of the Related Art

It is a recent trend for automatic transmissions to adopt a lock-up system which can turn a torque converter into a lock-up state in which its input and output elements are directly connected to each other during the vehicle drive in a lock-up region in which a torque increasing function or a torque fluctuation absorbing function by the torque converter is not required, in order to improve the transmission efficiency and thereby enhance the fuel economy.

This type of automatic transmission is fully described, for example, in "SERVICE MANUAL FOR NISSAN RE4R01A-TYPE FULL-RANGE ELECTRONICALLY-CONTROLLED AUTOMATIC TRANSMISSION" issued by Nissan Motor Co., Ltd., the assignee of the entire right and interest relative to the present application. To carry out a lock-up control of such automatic transmission, as exemplarily shown in FIG. 21 in which a lock-up ON line is denoted by a double-dotted line and a lock-up OFF line is denoted by a single-dotted line, it has been a conventional practice to judge the vehicle driving state in either of lock-up region (L/U) or converter region (C/V) determined by a throttle opening TH (engine operation load) and a vehicle speed V, and to apply a lock-up clutch in the lock-up region to turn the torque converter into the lock-up state in which the input and output elements are directly connected or to release the lock-up clutch in the converter region to turn the torque converter into the converter state in which the direct connection is released, in accordance with the result of judgment.

In order to enhance the fuel economy by locking up the torque converter, it is required to enlarge the lock-up region so that the torque converter can be locked up in as low load driving condition and as low vehicle speed as possible. Thus, the lock-up region is determined as shown in FIG. 21, for example.

Since the power from an engine is unnecessary during the coasting drive including the deceleration operation with the accelerator pedal released, there is known a fuel cut device which stops the fuel supply to the engine during the coasting drive thereby to improve the fuel economy of the vehicle. The fuel cut device stops the fuel cut to restart the fuel supply (fuel recovery) when the engine speed is lowered to a predetermined speed (fuel recovery engine speed) in order to prevent the engine from stalling. With such a fuel cut device, the fuel economy can be effectively improved particularly when the reduction of the engine speed during the coasting drive is delayed to prolong the fuel cut time. It is therefore a general practice, in a vehicle having an engine with a fuel cut device, to turn the torque converter into the lock-up state during the coasting drive in which the throttle opening TH is 0/8, as shown in FIG. 21.

In automatic transmissions wherein the torque converter during the coasting drive of the vehicle is turned into the lock-up state in which the input and output elements are directly connected with each other, when a braking of the vehicle is performed in the lock-up state of the torque converter, by depressing a brake pedal during the drive in the lock-up state, the rotation of wheels tends to be suddenly stopped. Such a tendency is significant particularly in the case of braking on a road with a low friction. However, the lock-up state of the torque converter cannot be swiftly released in response to the sudden stop of the wheels, due to a relatively large response delay of the torque converter. Thus, there may be instances wherein the engine in a drive-connection with the wheels undergoes stalling.

JP-A-4-370465 discloses a proposal wherein a relative rotation between the input and output elements of the torque converter is allowed by switching the torque converter from the lock-up state to a slip control state in which a slip occurs when the brake pedal is depressed during the coasting drive, and the lock-up of the torque converter is released upon sudden deceleration of the vehicle when the brake pedal is further depressed.

While such a proposal serves to solve the problem of the engine stalling due to the response delay of the lock-up release, a further problem may arise from the arrangement wherein the torque converter is turned into the slip state immediately after the coasting drive starts even when the brake is not applied suddenly. That is to say, the slip of the torque converter provokes a reduction in the engine speed corresponding to the slip amount and the fuel cut must be stopped to initiate fuel recovery at an earlier instant, thereby making it difficult to achieve a satisfactory fuel economy. In other words, the above-described proposal may not be a satisfactory solution to the extent that the engine stalling can be prevented only at a sacrifice of an improved fuel economy to be achieved by the fuel cut.

SUMMARY OF THE INVENTION

It is therefore an object of the present invention to provide an improved lock-up control apparatus for automatic transmission, which is capable of effectively preventing the engine from stalling while simultaneously maintaining an improved fuel economy achieved by the fuel cut.

The inventors conducted thorough investigations seeking for a solution of the above-mentioned object, and came to a recognition that the response delay of the lock-up release varies in accordance with the application capacity of the lock-up clutch, as shown in FIG. 22. That is to say, with reference to FIG. 23, when the application capacity of the lock-up clutch is lowered from a solid line to a broken line and from the broken line to a single-dotted line immediately before a moment $t_1$ when the lock-up release command is issued, there will be smaller response delays $\Delta t_1$, $\Delta t_2$, $\Delta t_3$ and $\Delta t_4$ before the lock-up release which is completed at the moment when similar lines of lock-up releasing pressure $P_R$ intersect the line of lock-up applying pressure $P_A$.

The inventors further reached a conception that, since the above-mentioned drawback that the improvement of the fuel economy by the fuel cut becomes less effective involves the slips of the torque converter immediately after the coasting drive starts even when no sudden braking is performed, it would be possible to prevent the engine from stalling due to the response delay of the lock-up release, by setting the application capacity of the lock-up clutch to a minimum application capacity within such a range that no slip of the torque converter occurs during the coasting drive which is not the sudden deceleration, without sacrificing the effectiveness of the improvement of the fuel economy by the fuel cut.

The present invention is based on the above-mentioned recognition and conception and provides an improved lock-up control apparatus for an automatic transmission including a torque converter which can be turned into a lock-up state by a lock-up clutch so that input and output elements of the torque converter are directly connected with each other. As schematically shown in FIG. 1, the lock-up control apparatus according to the present invention comprises:

a coasting drive detecting means for detecting a coasting drive including a sudden deceleration operation of the vehicle;

a sudden deceleration detecting means for detecting a large deceleration rate above a predetermined value of the vehicle; and a coasting drive lock-up capacity controlling means for controlling an application capacity of the lock-up clutch to a minimum application capacity within such a range that a relative rotation is not generated between the input and output elements of the torque converter in a period when the deceleration rate of the vehicle is below the predetermined value during the coasting drive in response to signals from both the detecting means.

The torque converter according to the present invention is turned in the lock-up state in which the input and output elements are directly connected with each other by the lock-up clutch.

Here, the coasting drive detecting means detects the coasting drive including a decelerating operation of the vehicle and a sudden deceleration detecting means detects a large deceleration rate above a predetermined value of the vehicle. In response to signals from both the detecting means, the coasting drive lock-up capacity controlling means controls the application capacity of the lock-up clutch to a minimum application capacity within such a range that the relative rotation is not generated between the input and output elements of the torque converter in a period during which the deceleration rate of the vehicle is below the predetermined value even when the coasting drive is performed.

Since the application capacity of the lock-up clutch is controlled so as to be the minimum application capacity within such a range that the relative rotation is not generated between the input and output elements of the torque converter during the coasting drive when the deceleration rate of the vehicle is below the predetermined value, the release of the application of the lock-up clutch which is performed when the deceleration rate of the vehicle thereafter becomes above the predetermined value can be rapidly achieved with a small response delay, eliminating such a drawback that the engine is stopped even when the sudden deceleration is performed. These results are not achieved by the slip control of the torque converter, but they can be obtained while maintaining the lock-up state of the torque converter, and hence there occurs no problem such as that the fuel cut time is shortened thereby sacrificing the effectiveness of improvement of the fuel consumption by the fuel cut.

Advantageously, the lock-up control apparatus according to the present invention has a structure such that the coasting drive lock-up capacity controlling means controls the application capacity of the lock-up clutch by a prearranged command value, and further comprises: a torque converter slip detecting means for detecting whether the relative rotation between the input and output elements of the torque converter is generated during this control; and a coasting drive lock-up capacity command value varying means for varying the prearranged command value so that the relative rotation between the input and output elements of the torque converter is not generated when the relative rotation between the input and output elements of the torque converter is generated in response to a signal from the torque converter slip detecting means.

In this instance, the torque converter slip detecting means detects whether the relative rotation is produced between the input and output elements of the torque converter when the coasting drive lock-up capacity controlling means controls the application capacity of the lock-up clutch by a prearranged command value. In response to a signal from the detecting means, the coasting drive lock-up capacity command value varying means varies the prearranged command value so that the relative rotation between the input and output elements of the torque converter is not generated when the relative rotation between the input and output elements of the torque converter is produced. The application capacity control for the lock-up clutch during the coasting drive by the coasting drive lock-up capacity controlling means can therefore be such a control that no slip of the torque converter is surely caused, thereby assuredly achieving the above-described corresponding results.

In the lock-up control apparatus according to the present invention, the coasting drive lock-up capacity controlling means may comprise: a reverse driving torque detecting means for detecting a reverse driving torque of a engine in a forward speed of the automatic transmission; and a coasting drive lock-up capacity operating means for calculating a minimum application capacity of the lock-up clutch within such a range that the relative rotation is not generated between the input and output elements of the torque converter from the reverse driving torque detected by the reverse driving torque detecting means, thereby controlling the application capacity of the lock-up clutch by a command value corresponding with the application capacity calculated from the coasting drive lock-up capacity operating means.

In this instance, the reverse driving torque detecting means detects a reverse driving torque of the engine in a forward speed of the automatic transmission, and the coasting drive lock-up capacity operating means calculates a minimum application capacity of the lock-up clutch within such a range that the relative rotation is not generated between the input and output elements of the torque converter from the reverse driving torque detected by the reverse driving torque detecting means. Further, the coasting drive lock-up capacity controlling means controls the application capacity of the lock-up clutch by a command value corresponding with the application capacity calculated by the coasting drive lock-up capacity operating means. In this case, the application capacity control for the lock-up clutch during the coasting drive by the coasting drive lock-up capacity controlling means can also be a control by which no slip of the torque converter is securely caused, thereby surely achieving the above-mentioned corresponding results.

In the lock-up control apparatus according to the present invention, the reverse driving torque detecting means may retrieve and obtain a reverse driving torque on the basis of a prearranged map from a number of revolutions of the engine.

In this instance, the reverse driving torque detecting means retrieves for and obtains a reverse driving torque of the engine from a number of revolutions of the engine on the basis of a prearranged map. In this case, the reverse driving torque of the engine can be easily and inexpensively obtained without adding any sensor.

In the lock-up control apparatus according to the present invention, the reverse driving torque detecting means may correct the reverse driving torque detection value of the engine by an amount of increase/decrease in torque by an auxiliary device to be driven by the engine in accordance with an operation/non-operation of the auxiliary device.

In this instance, the reverse driving torque detecting means corrects a reverse driving torque detection value of the engine by an amount of increase/decrease in the torque by an auxiliary to be driven by the engine in accordance with an operation/non-operation of this auxiliary. In this case, the reverse driving torque can be securely detected without being affected by the operation/non-operation of the auxiliary, and it is possible to assuredly achieve the above-described effect that the control of the application capacity of the lock-up clutch during the coasting drive by the coasting drive lock-up capacity controlling means can be a control by which no slip of the torque converter is surely caused.

In the lock-up control apparatus according to the present invention, the reverse driving torque detecting means may correct the reverse driving torque detection value of the engine in accordance with a coolant temperature of the engine.

In this instance, the reverse driving torque detecting means corrects the reverse driving torque detection value of the engine in accordance with a coolant temperature of the engine. In this case, the reverse driving torque can be securely detected without being affected by a variation in the temperature of the engine, and it is possible to assuredly achieve the above-described effect that the control of the application capacity of the lock-up clutch during the coasting drive by the coasting drive lock-up capacity controlling means can be a control by which no slip of the torque converter is surely caused.

The lock-up control apparatus according to the present invention may further comprise: a braking detecting means for detecting the braking of the vehicle; an accelerator operation detecting means for detecting the application of an accelerator pedal of the vehicle; and a lock-up forced releasing means for forcedly releasing the lock-up clutch when both the braking detection and the accelerator pedal application detection are simultaneously carried out by these means.

In this instance, when the braking detecting means detects the braking of the vehicle and the accelerator operation detecting means detects the application of the accelerator pedal, the lock-up forced releasing means forcedly releases the lock-up clutch. Since the detection by the coasting drive detecting means is impossible at the time of a driving operation such as the application of the accelerator pedal while braking, it is not possible to expect a result such that the application capacity of the lock-up clutch is set to a minimum application capacity within such a range that the relative rotation is not generated between the input and output elements of the torque converter by the coasting drive lock-up capacity controlling means before the sudden deceleration and the above-described corresponding effect can not be also obtained, but the occurrence of the engine stalling can be prevented by forcedly releasing the lock-up clutch in advance.

In the lock-up control apparatus according to the present invention, the coasting drive lock-up capacity controlling means may control the application capacity of the lock-up clutch by a prearranged command value and this command value is set to a value corresponding with the release of the lock-up clutch during a predetermined time after the coasting drive detecting means detects the transition to the coasting drive of the vehicle.

In this instance, when the coasting drive lock-up capacity controlling means controls the application capacity of the lock-up clutch by a prearranged command value, this command value is set to a value corresponding with the release of the lock-up clutch during a predetermined time after the coasting drive detecting means detects the transition to the coasting drive of the vehicle. In this case, since the application capacity of the lock-up clutch can be rapidly lowered to a minimum application capacity within such a range that the relative rotation is not produced between the input and output elements of the torque converter and it usually takes much time to lower it to this minimum application capacity, the above-described effect can not be expected even when the sudden deceleration is detected before lowering to this minimum application capacity, but this drawback can be eliminated according to the eighth aspect of the present invention.

The lock-up control apparatus according to the present invention may further comprise a timer means for measuring the time from the completion of the control by the coasting drive lock-up capacity controlling means to a next coasting drive and the predetermined time during which the command value is set to a value corresponding with the release of the lock-up clutch is shortened as the time measured by the timer means becomes short.

In this instance, the timer means measures the time from the completion of the control by the coasting drive lock-up capacity controlling means to a next coasting drive, and the above-mentioned predetermined time during which the command value is set to the value corresponding with the release of the lock-up clutch is shortened as the time measured by the timer means becomes short. Since the application capacity of the lock-up clutch is not recovered and still small when the time from the completion of the control by the coasting drive lock-up capacity controlling means to a next coasting drive is short, the control according to the eighth aspect of the present invention such that the command value for controlling the application capacity of the lock-up clutch is set to the value corresponding with the release of the lock-up clutch tends to deteriorate the fuel consumption by extremely lowering the application capacity of the lock-up clutch, but this tendency can be eliminated according to the ninth aspect of the present invention.

BRIEF DESCRIPTION OF THE DRAWINGS

FIG. 8 is a time chart showing the operation of the lock-up control apparatus in the embodiments illustrated in FIGS. 2 to 7;

FIG. 9 is a flowchart showing a program for obtaining the coasting drive lock-up capacity by an arithmetic operation;

FIG. 10 is a graph showing the relationship between a reverse driving torque to be retrieved and the engine speed in the embodiments illustrated in FIGS. 2 to 7;

FIG. 11 is a graph showing the relationship between the lock-up applying pressure to be retrieved and a line pressure solenoid driving duty in the embodiments illustrated in FIGS. 2 to 7;

FIG. 12 is a graph showing the relationship between a lock-up solenoid driving duty to be retrieved and a target lock-up releasing pressure in the embodiments illustrated in FIGS. 2 to 7;

FIG. 13 is a characteristic view of an air conditioner driving load which affects the reverse driving torque to be retrieved in the embodiments illustrated in FIGS. 2 to 7;

FIG. 14 is a graph showing the relationship between the reverse driving torque to be retrieved and the engine coolant temperature in the embodiments illustrated in FIGS. 2 to 7;

FIG. 15 is a flowchart showing the main routine of the lock-up control according to still another embodiment of the present invention;

FIG. 18 is not adopted;

FIG. 21 is a regional graph exemplifying a lock-up region of an automatic transmission;

FIG. 22 is a graph showing the relationship between the lock-up clutch application capacity and the response delay of the lock-up release.

DETAILED DESCRIPTION OF THE PREFERRED EMBODIMENTS

Some preferred embodiments of the present invention will now be described in greater detail hereinafter, with reference to the accompanying drawings.

Figure 1:
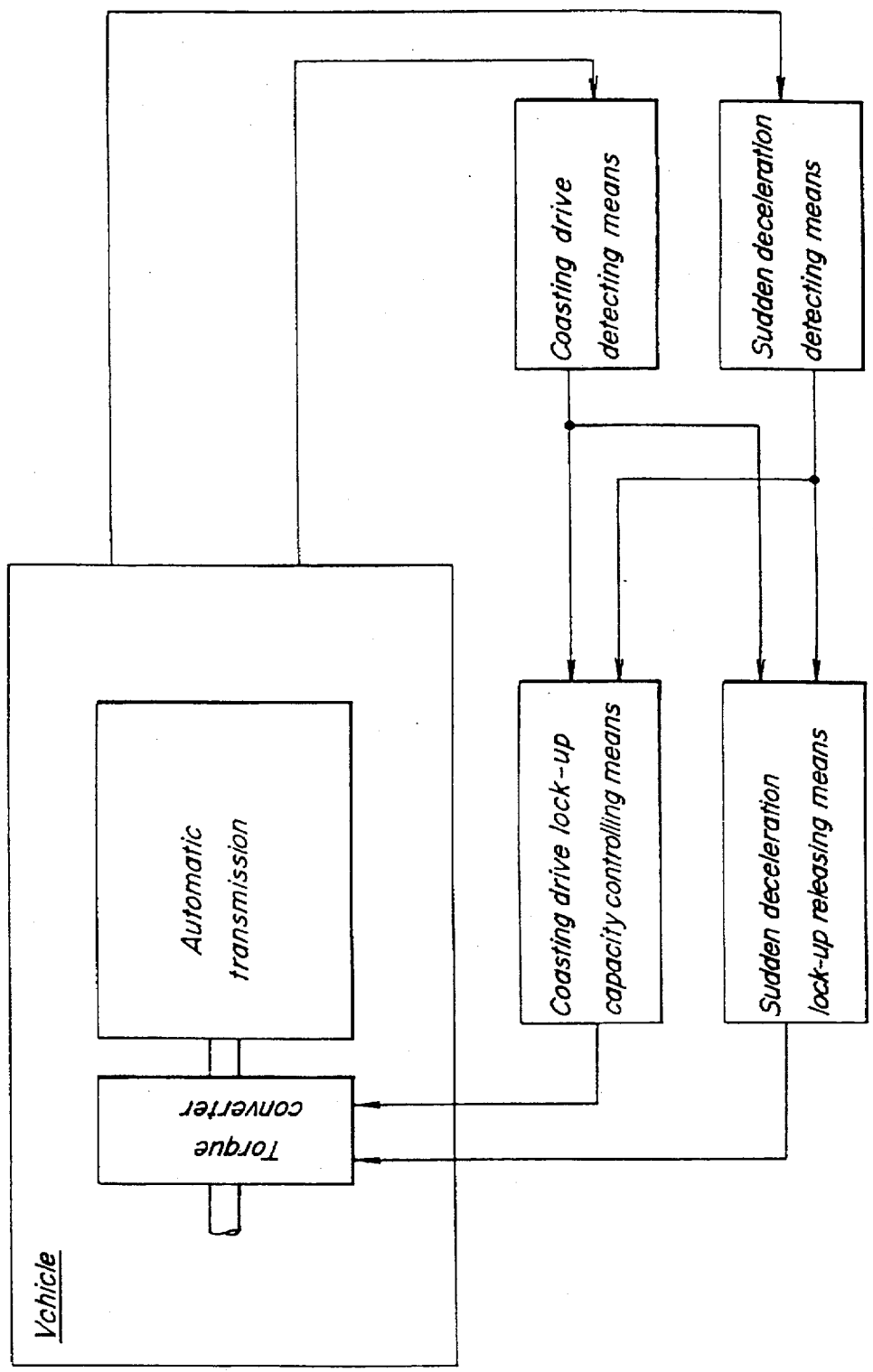
FIG. 1 is a schematic diagram showing the basic arrangement of the lock-up control apparatus according to the present invention.
Figure 2:
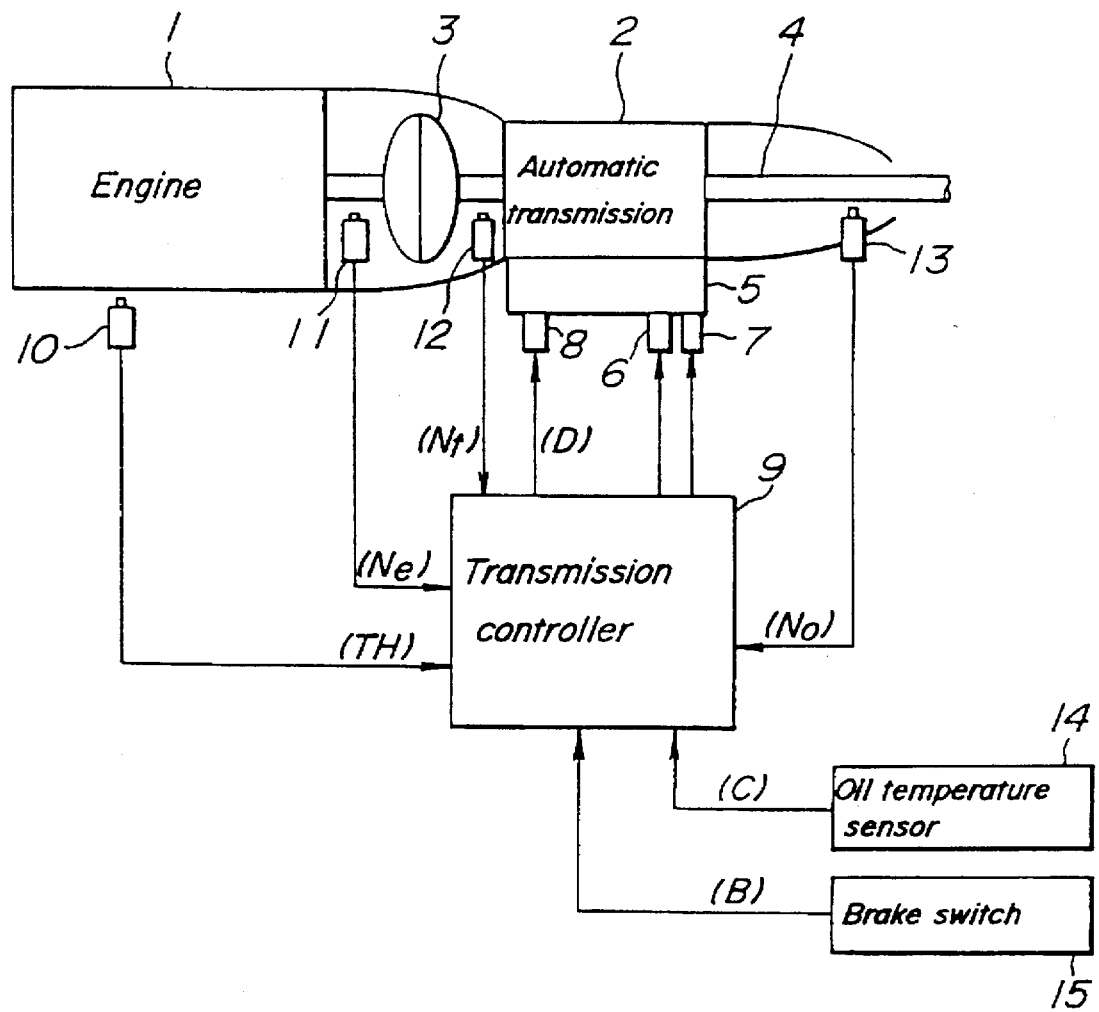
FIG. 2 is a system diagram showing one embodiment of the lock-up control apparatus according to the present invention.

FIG. 2 shows a lock-up control apparatus for an automatic transmission according to one embodiment of the present invention, wherein reference numeral 1 denotes an engine and reference numeral 2 designates an automatic transmission. The automatic transmission 2 receives the power of the engine 1 through a torque converter 3 and changes the input rotation with a gear ratio corresponding with a selected speed range so as to be transmitted to an output shaft 4.

Here, the speed range of the automatic transmission 2 is selected by the combination of ON/OFF states of shift solenoids 6 and 7 in a control valve 5. Furthermore, the torque converter 3 can be selectively turned to the converter state in which input and output elements are not directly connected with each other, and the lock-up state in which the input and output elements are directly connected with each other by a lock-up clutch (not shown), with a duty control of a lock-up solenoid 8 in the control value 5. The lock-up solenoid 8 turns the torque converter 3 into the converter state by the release of the lock-up clutch when the driving duty is 0%, and turns the torque converter 3 into the lock-up state by the application of the lock-up clutch when the driving duty is 100%.

A controller 9 controls the ON/OFF states of the shift solenoids 6 and 7 and the driving duty D of the lock-up solenoid 8, and receives (i) a signal from a throttle opening sensor 10 for detecting the throttle opening TH of the engine 1, (ii) a signal from an engine speed sensor 11 for detecting the engine speed Ne, (iii) a signal from a turbine speed sensor 12 for detecting the input speed Nt of the automatic transmission 2 (i.e., the output speed of the torque converter 3), (iv) a signal from a transmission output speed sensor 13 for detecting the speed No of the transmission output shaft 4, (v) a signal from an oil temperature sensor 14 for detecting a transmission hydraulic oil temperature C, and (vi) a signal B from a brake switch 15 which is turned ON when the brake pedal is depressed.

Although not shown, the controller 9 performs a speed-change control by an arithmetic operation known, per se, on the basis of the above-described input information, as follows. That is, when controlling to vary the speed, the controller 9 obtains a speed which is optimum for the current driving state from the throttle opening TH and the vehicle speed V which is calculated from the transmission output speed No in accordance with, for example, a look-up method using a table data, and performs a predetermined speed-change by turning the ON/OFF states of the shift solenoids 6 and 7 so that the optimum speed range is selected.

Figure 3:
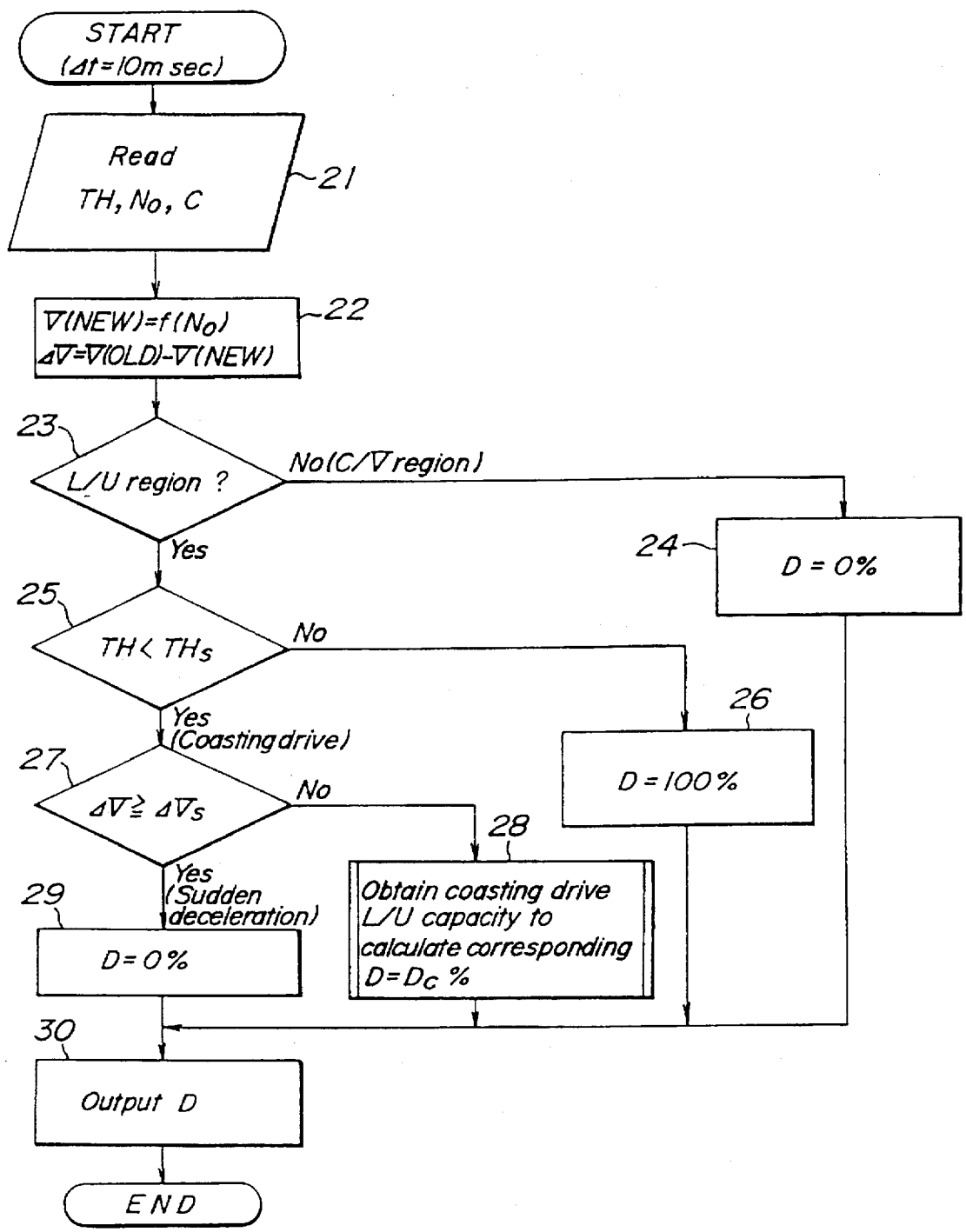
FIG. 3 is a flowchart showing a main routine of the lock-up control performed by a transmission controller in the embodiment illustrated in FIG. 2.

For explaining the lock-up control, it is assumed that the controller 9 repeats the main routine shown in FIG. 3 by a constant interruption which is carried out every $\Delta T=10$ msec when effecting the lock-up control. In the first place, at the step 21, the throttle opening TH, the transmission output speed No and the transmission hydraulic oil temperature C are read. At the next step 22, the vehicle speed V is calculated from the transmission output speed No and set to V (NEW), and a vehicle deceleration rate is obtained from a difference $\Delta V$ between a previous vehicle speed calculated value V (OLD) and the current vehicle speed calculated value V (NEW).

At the step 23, the judgment is made upon which region, i.e., the lock-up region L/U or the converter region C/L the driving state belongs to from the throttle opening TH and the vehicle speed V in accordance with the look-up method using the table data corresponding with, e.g., a lock-up vehicle speed graph shown in FIG. 21. Here, in the case of the converter region C/V, the driving duty D of the lock-up solenoid 8 is set to 0% at the step 24 and this driving duty is output to the lock-up solenoid 8 at the step 30 to normally turn the torque converter 3 into the converter state by the release of the lock-up clutch as requested.

When the lock-up region L/U is judged at the step 23, the judgment is made upon whether the vehicle is carrying out the coasting drive including the deceleration in accordance with whether or not the throttle opening TH is below a minute predetermined value THs, at the step 25 corresponding to the coasting drive detecting means. When the non-coasting drive is judged, the driving duty D of the lock-up solenoid 8 is set to 100% at the step 26 and this driving duty D is output to the lock-up solenoid 8 at the step 30 to normally turn the torque converter 3 into the lock-up state by the application of the lock-up clutch as requested. Although not shown, it is needless to say that the coasting drive can be alternatively judged in accordance with an idle switch which is turned ON when releasing the accelerator pedal at the step 25 as the coasting drive detecting means.

Figure 4:
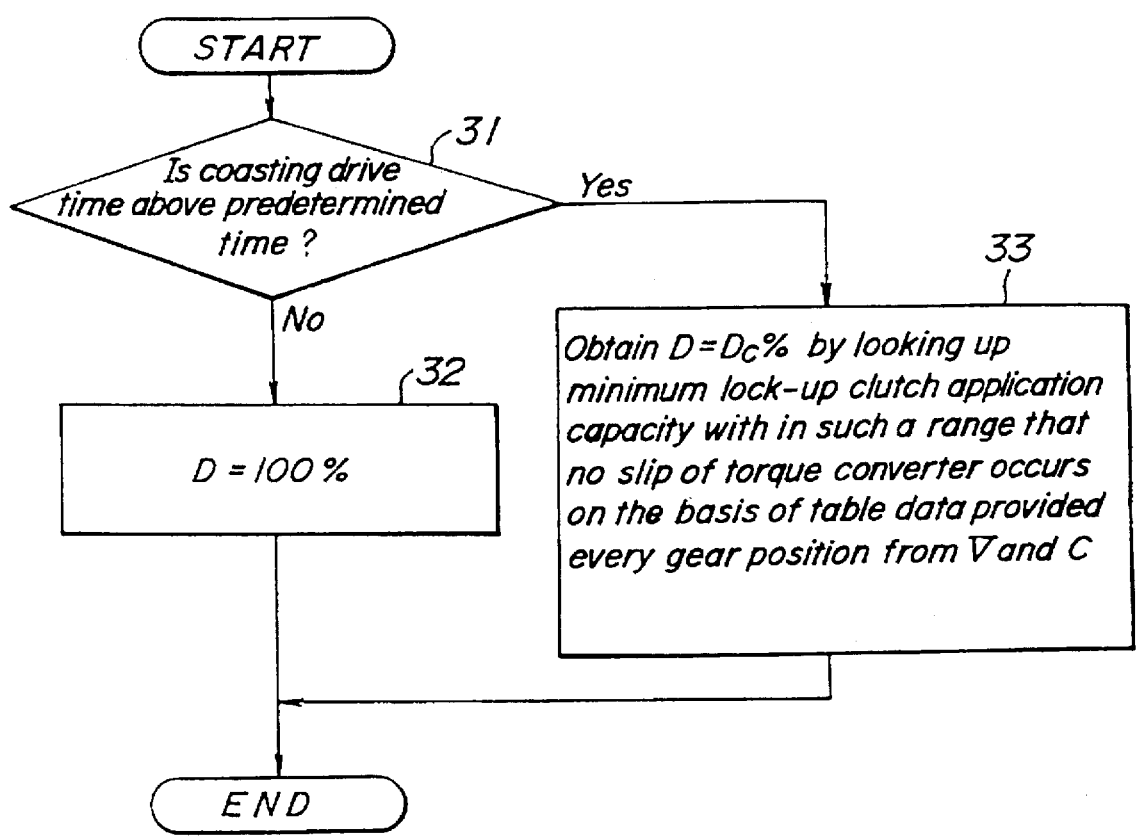
FIG. 4 is a flowchart showing a subroutine related to a coasting drive lock-up capacity control in the main routine illustrated in FIG. 3.

When the coasting drive is judged at the step 25, the judgment is made upon whether a sudden deceleration is carried out in accordance with whether or not the vehicle deceleration rate ΔV is above a predetermined value ΔVs, at the step 27 corresponding to the sudden deceleration detecting means. If it is not a sudden deceleration, the application capacity of the lock-up clutch for the coasting drive is obtained, and the driving duty Dc % of the lock-up solenoid 8 corresponding with the obtained capacity is calculated to set the result to the lock-up solenoid driving duty D, at the step 28 corresponding to the coasting drive lock-up capacity controlling means. This processing is as shown in FIG. 4, and the driving duty D is set to 100% for the time being in coincidence with the fact that the driving state is in the lock-up region L/U at the step 32, until the time during which the coasting drive continues at least for a predetermined time at the step 31, namely, until the coasting drive becomes stable. When the coasting drive continues over the predetermined time and the coasting drive is stabilized, the application capacity of the lock-up clutch for the coasting drive is retrieved on the basis of maps provided for each gear position, from the vehicle speed V and the transmission hydraulic oil temperature C, and the driving duty Dc % for achieving this capacity is calculated to set the result to the lock-up solenoid driving duty D at the step 33. Here, the application capacity of the lock-up clutch for the coasting drive is determined as a minimum lock-up clutch application capacity within such a range that no slip of the torque converter 3 (the lock-up clutch) occurs, and is previously obtained for each gear position as two-dimensional data of the vehicle speed V and the transmission hydraulic oil temperature C, by experiments and the like.

The thus-obtained driving duty D for the coasting drive is output to the lock-up solenoid 8 at the step 30 shown in FIG. 3, and the lock-up clutch of the torque converter 3 is applied by a minimum application capacity within such a range that no slip occurs.

Thereafter, when the sudden deceleration is judged at the step 27 shown in FIG. 3, the driving duty D of the lock-up solenoid 8 is set to 0% at the step 29 corresponding to the sudden deceleration lock-up releasing means, and this driving duty is output to the lock-up solenoid 8 at the step 30. Consequently, the torque converter 3 is released from the lock-up state to be turned into the converter state, and the engine 1 can be prevented from being stopped by the braked wheels at the time of sudden deceleration of the vehicle. The application capacity of the lock-up clutch is controlled to be the minimum application capacity within such a range that no slip of the torque converter 3 occurs as described in connection with FIG. 4 during the coasting drive before the sudden deceleration. In other words, the lock-up releasing pressure $P_R$ is previously lowered to $P_{RC}$ corresponding with D=Dc % by the above-mentioned capacity control during a period from a transition moment $t_1$ for the coasting drive to a sudden deceleration moment $t_3$ involved by the braking operation at a moment $t_2$, as shown in a time chart of FIG. 8. Therefore, the above-described lock-up release to be completed at a moment $t_4$ when the line of the lock-up releasing pressure $P_R$ intersects that of the lock-up applying pressure $P_A$ can be rapidly achieved, and the response delay ΔTc of the lock-up release can be reduced, so as to eliminate such a drawback that the engine stalling may occur.

Since the above-described effects can be established by these controls without producing any slip at the torque converter 3, there is no problem that the reduced engine speed due to the slip involves the shortened fuel cut time and the fuel cut sacrifices the effectiveness of improvement of the fuel consumption.

Since the application capacity of the lock-up clutch determined for the coasting drive is a fixed value previously obtained by experiments and others in the above-described embodiment, the application capacity cannot be a minimum lock-up clutch application capacity within such a range that no slip of the torque converter 3 occurs due to a difference in individual vehicles or a variation in driving conditions, and there may arise a problem that the above-mentioned effects cannot be properly achieved.

Figure 5:
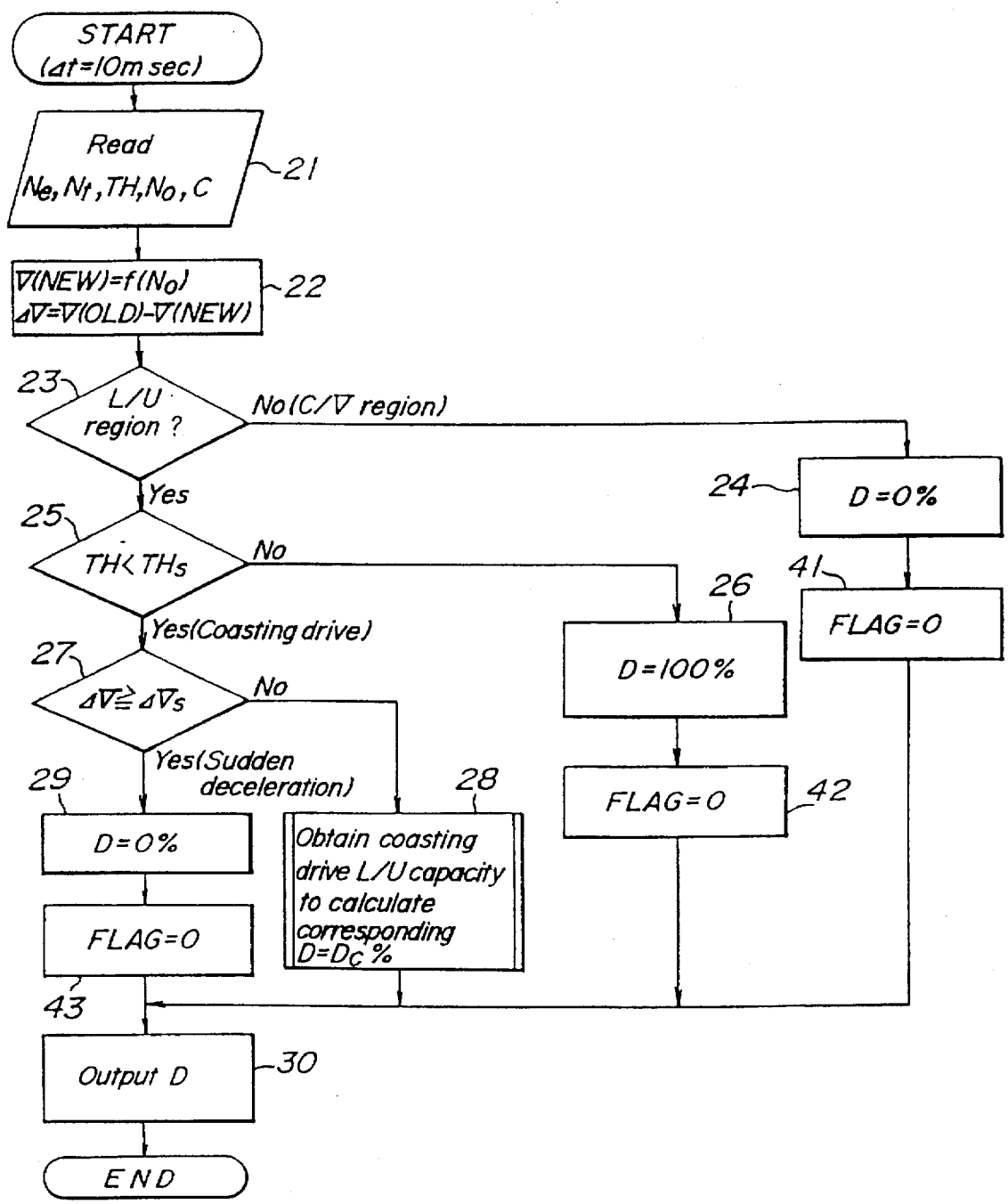
FIG. 5 is a flowchart showing a main routine of a lock-up control of another embodiment according to the present invention.
Figure 6:
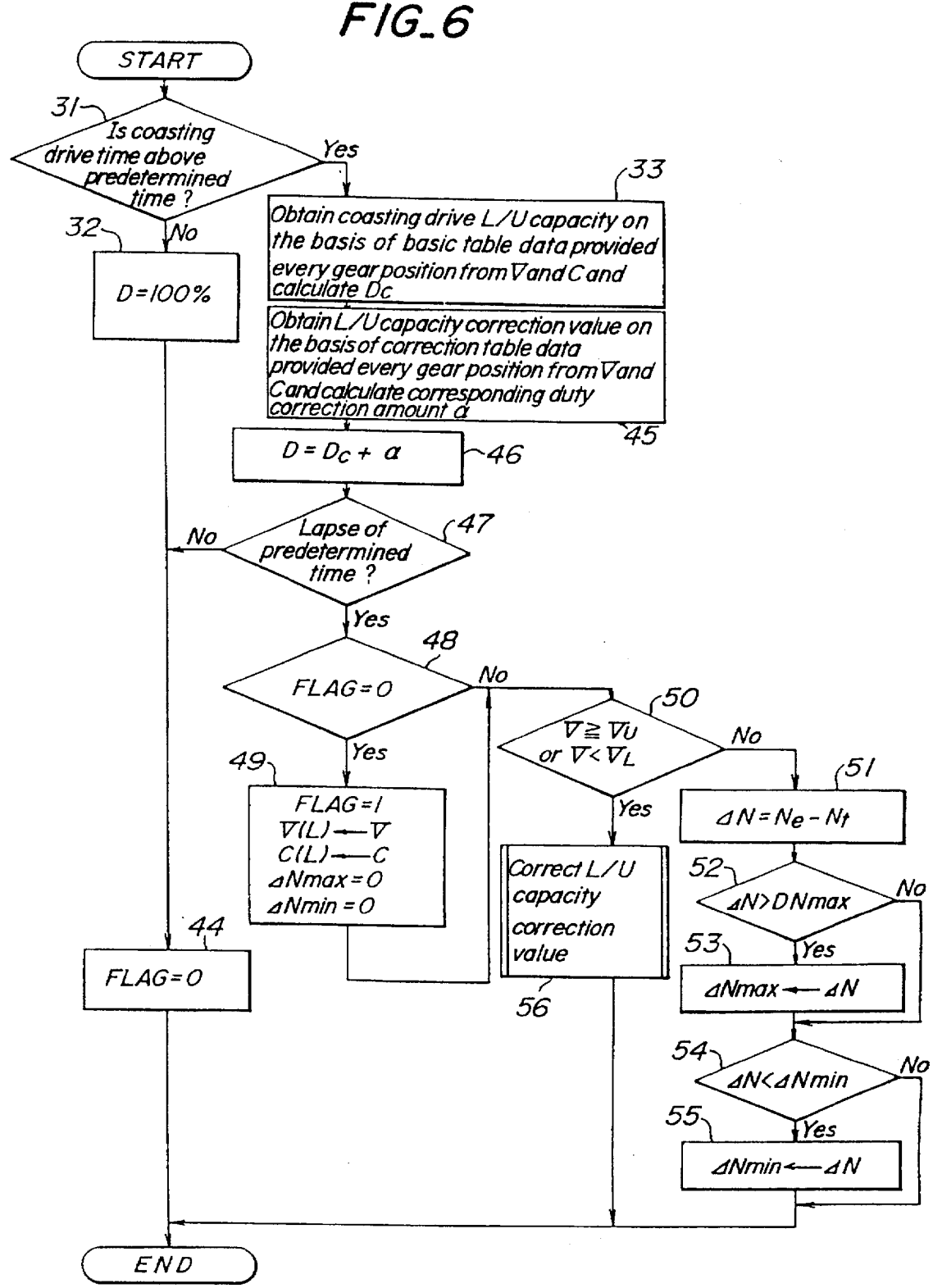
FIG. 6 is a flowchart showing a subroutine related to a coasting drive lock-up capacity control in the main routine illustrated in FIG. 5.
Figure 7:
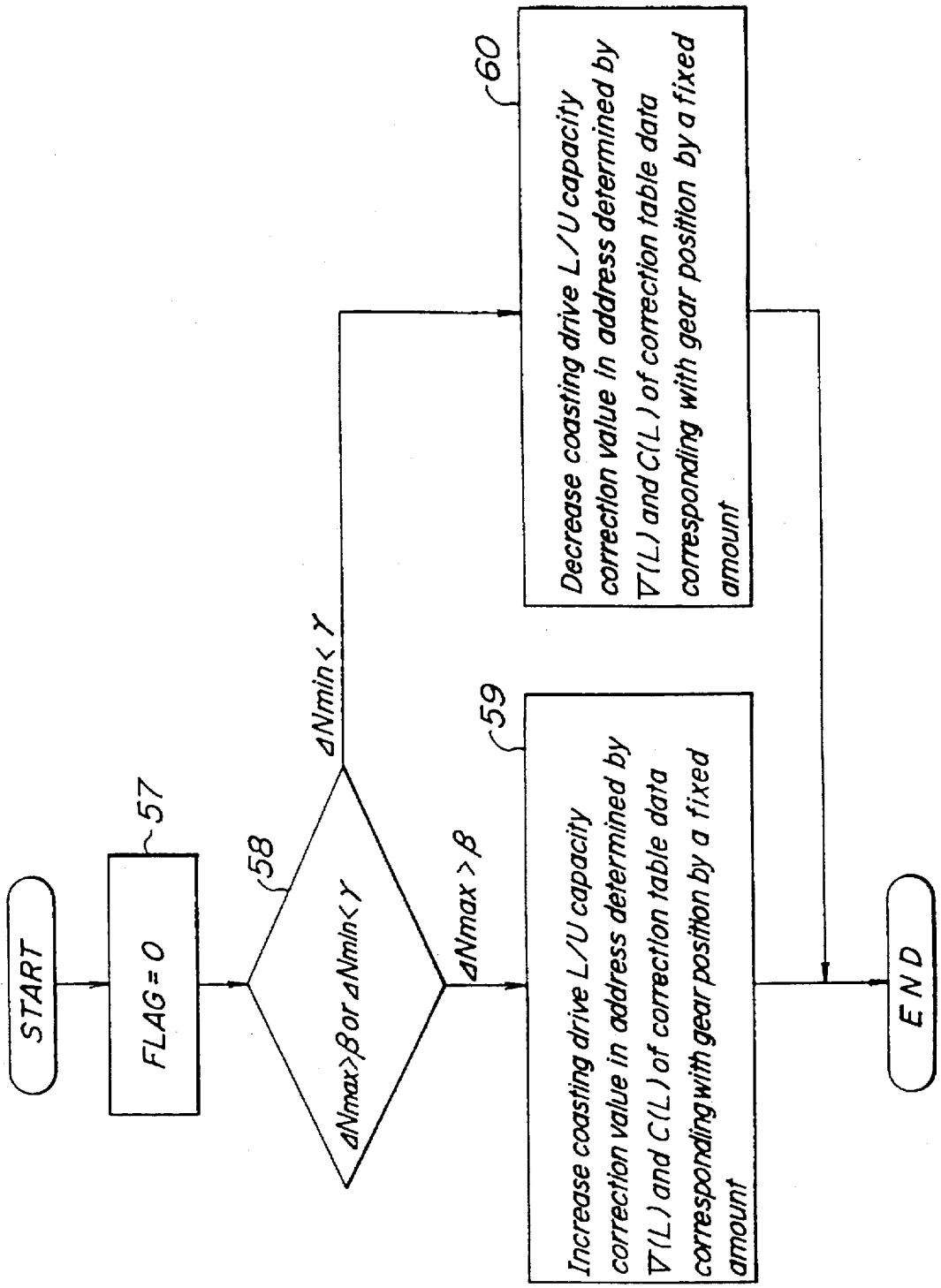
FIG. 7 is a flowchart showing a subroutine related to a learning control program of the coasting drive lock-up capacity in the embodiment illustrated in FIG. 5.

FIGS. 5 to 7 show another embodiment of the present invention which can eliminate the above-mentioned problem, and in which the application capacity of the lock-up clutch for the coasting drive is not determined to be a fixed value and is changed by a learning control in accordance with whether or not the slip of the torque converter occurs during the coasting drive in this example. FIG. 5 shows a main routine substituting that of FIG. 3, and the unnecessary erroneous learning can be prevented by additionally reading the engine speed Ne at the step 21 and adding steps 41, 42 and 43 wherein a learning control flag FLAG is reset to 0 in this example, performing the learning control only at the step 28 in which the learning control must be carried out.

The operation at the step 28 is as shown in FIG. 6 instead of FIG. 4, and the step 44 at which the learning control flag FLAG is reset to 0 follows the step 32 to prevent the unnecessary erroneous learning while the steps 45 to 55 are added after the step 33. At the step 45, a correction value of the application capacity of the lock-up clutch for the coasting drive is retrieved on the basis of a correction table data map provided for each gear position from the vehicle V and the transmission hydraulic oil temperature C, and the driving duty correction amount α % corresponding with this capacity correction value is calculated. Subsequently, at the step 46, Dc % corresponding with the coasting drive lock-up clutch application capacity obtained at the step 33 is added to the correction amount α % to calculate the lock-up solenoid driving duty D, and the lock-up clutch application capacity control based on D=Dc+α is carried out.

At the step 47, when a predetermined time is judged to be lapsed after the start of the lock-up clutch application capacity control, the lock-up clutch application capacity correction value for the coasting drive to be retrieved at the step 45 is corrected by the following learning control. The operation of the step 49 is performed only for the first time to set the flag FLAG to 1 in accordance with the judgment upon the flag FLAG at the step 48; the vehicle speed V is set to a current learning control vehicle speed V (L); the hydraulic oil temperature C is set to a current learning control hydraulic oil temperature C (L); and a maximum value $\Delta N_{max}$ and a minimum value $\Delta N_{min}$ of the torque converter slip amount are initialized as 0, respectively.

At the next step 50, the judgment is made upon whether the vehicle speed V deviates from the range between a quantize upper limit value $V_U$ and a quantize lower limit value $V_L$ relating to the learning control vehicle speed V (L) of the table data for use in retrieval at the steps 33 and 45. If the vehicle speed V has a value between the quantize upper limit value $V_U$ and the quantize lower limit value $V_L$, the slip amount ΔN of the torque converter is calculated using the expression $\Delta N=Ne-Nt$ at the steps 51 to 55 corresponding to the torque converter slip detecting means, and $\Delta N_{max}$ is renewed to $\Delta N$ when $\Delta N$ is larger than $\Delta N_{max}$ while $\Delta N_{min}$ is renewed to $\Delta N$ when $\Delta N$ is smaller than $\Delta N_{min}$. As a result, it is possible to obtain the maximum slip amount $\Delta N_{max}$ and the minimum slip amount $\Delta N_{min}$ of the torque converter when the vehicle speed V has a value between the quantize upper limit value $V_U$ and the quantize lower limit value $V_L$.

When the vehicle speed V is judged to deviate from the range between the quantize upper limit value $V_U$ and the quantize lower limit value $V_L$ at the step 50, the lock-up clutch application capacity correction value for the coasting drive used for retrieval at the step 45 is corrected by the learning control on the basis of $\Delta N_{max}$ and $\Delta N_{min}$ at the step 56. This learning control is as shown in FIG. 7, and the learning control flag FLAG is first reset to 0 at the step 57, and thereafter the judgment is made upon whether $\Delta N_{max}$ is larger than a minute slip amount predetermined value β or whether $\Delta N_{min}$ is smaller than a further minute slip amount predetermined value γ at the step 58. Here, the further minute slip amount predetermined value γ is not 0 and set as a minute predetermined value which is close to 0 limitlessly because the judgment of 0 is impossible. Further, the minute slip amount predetermined value β is set because the hysteresis for avoiding hunting of the control must be set.

When $\Delta N_{max}$ is larger than the slip amount predetermined value β, namely, when the slip of the torque converter occurs at the time of lock-up clutch application capacity control during the coasting drive, the lock-up clutch application capacity correction value for the coasting drive provided at an address determined by V (L) and C (L) of the corresponding correction table data for use in retrieval at the step 45 is increased by a fixed amount so that no slip occurs at the step 59 corresponding to the coasting drive lock-up capacity command value varying means. When $\Delta N_{min}$ is smaller than the slip amount predetermined value γ, the coasting drive lock-up clutch application capacity correction value provided at a suitable address of the corresponding correction table used for retrieval at the step 45 is decreased by a fixed amount at the step 60. It is thus possible to avoid the failure of the achievement of the above-described effects which is caused when the coasting drive lock-up clutch application capacity unnecessarily becomes excessive. According to the above-mentioned learning control, the coasting drive lock-up clutch application capacity corresponding with the driving duty D obtained at the step 46 shown in FIG. 6 is constantly corrected to be a minimum lock-up clutch application capacity within such a range that no slip of the torque converter 3 occurs irrespective of a difference in individual vehicles and a variation in driving conditions, so that the effects of the first embodiment can be securely achieved.

FIG. 9 shows another embodiment of the present invention in which the solenoid driving duty Dc for the coasting drive lock-up clutch application capacity control is obtained by a method different from that of the step 28 shown in FIG. 3, and substitutes for FIG. 4. In this embodiment, at the step 61 corresponding to a reverse driving torque detecting means, a reverse driving torque T applied to the engine during the coasting drive is first retrieved and obtained from the engine speed Ne on the basis of the table data which are shown in FIG. 10 and previously obtained by experiments and others. Subsequently, at the step 62, a lock-up releasing pressure Pr which is well balanced with the reverse driving torque T is calculated. Here, it is assumed that the lock-up applying pressure $P_A$ constantly acting on a lock-up clutch piston in a direction opposed to that of the lock-up releasing pressure is $P_A$, a pressure area of the lock-up clutch piston is S, its facing friction coefficient is μ, and a mean radius of the facing is R. The lock-up releasing pressure Pr well balanced with the reverse driving torque T is represented as $Pr=P_A-(T/S\cdot\mu\cdot R)$ and the lock-up applying pressure $P_A$ can be retrieved because it is known that $P_A$ varies as shown in FIG. 11 in accordance with a line pressure controlled by the line pressure solenoid driving duty which is an internal signal of the transmission controller 9. The lock-up releasing pressure Pr which is well balanced with the reverse driving torque can be calculated by the above arithmetic operation.

At the next step 63 corresponding to the coasting drive lock-up capacity operating means, a predetermined value δ is subtracted from the lock-up releasing pressure Pr which has been calculated by the above expression and is well balanced with the reverse driving torque T to obtain a target lock-up releasing pressure $P_R$. The predetermined value δ is subtracted because the slip of the torque converter may not be completely maintained to be 0 with the lock-up releasing pressure Pr well balanced with the reverse driving torque T and the lock-up releasing pressure $P_R$ must be set with a certain latitude.

At the next step 64, the table data corresponding with, e.g., FIG. 12 is searched for the duty Dc for attaining the target lock-up releasing pressure $P_R$, and the obtained duty is set to the lock-up solenoid driving duty D. The thus-obtained D=Dc % corresponds with a minimum lock-up clutch application capacity within such a range that no slip of the torque converter 3 occurs and is capable of achieving the same effects with those of the above-described embodiments. Although the reverse driving torque T of the engine is retrieved by the look-up method in this example, it may be directly obtained by the torque sensor. It is needless to say, however, that the illustrated embodiment requires no additional sensor and is advantageous in cost.

When using no torque sensor, there naturally occurs an error between the retrieved reverse driving torque T and an actual value due to the operation/non-operation of auxiliary devices driven by the engine such as an air conditioner, a power steering apparatus and an alternator, or due to the engine coolant temperature. Hence, the correction may be taken for correcting such error. Using an air conditioner as an example of the auxiliary device, since the driving load of air conditioner does not significantly vary by the engine speed Ne as shown in FIG. 13, it is set that only the ON/OFF state of the air conditioner is detected. The driving load of the air conditioner is added to the retrieved reverse driving torque T, and the control shown in FIG. 9 is performed at the time of ON. Further, the correction is not carried out at the time of OFF. Moreover, since the engine coolant temperature is substantially same as the hydraulic oil temperature C of the transmission and the reverse driving torque varies in accordance with the coolant temperature as shown in FIG. 14, the reverse driving torque retrieve value T is corrected in accordance with the temperature C in anticipation of variation in the reverse driving torque.

When any of the above-described embodiments is adopted, the coasting drive is judged at the time when the throttle opening TH is below the predetermined opening THs and the lock-up clutch application capacity control during the above-mentioned coasting drive is carried out. Thus, the lock-up clutch application capacity control during the coasting drive may become impossible if an abnormal operation such that the brake pedal is depressed while putting on the accelerator pedal by using two feet is effected, and hence the above-described effects cannot be obtained.

The effect of the respective embodiments at the time of the abnormal operation will be described with reference to FIG. 16 corresponding with FIG. 8. At a moment $t_2$ of the abnormal operation such that the brake pedal is depressed while putting on the accelerator pedal, the lock-up clutch application capacity control during the coasting drive cannot be started and the normal deceleration lock-up releasing control is carried out at a moment $t_3$ when the vehicle deceleration rate $\Delta V$ becomes a predetermined deceleration rate $\Delta Vs$. Thus, the lock-up applying pressure $P_A$ decreases as indicated by a dotted line while the lock-up releasing pressure $P_R$ increases as indicated by another dotted line, thereby completing the deceleration lock-up release at a moment $t_4$ where the lines of the pressures intersect. However, the lock-up releasing time $t_4$ may be too late to come, and the engine stalling may occur as apparent from the change with the elapse indicated by the dotted line of the engine speed Ne.

FIG. 15 shows an embodiment which can eliminate such a potential problem and substitutes for FIG. 3. In FIG. 15, the steps for the same operations with those shown in FIG. 3 are designated by the like reference numerals. In this example, a brake switch signal B is additionally read at the step 21, and the step 71 is inserted between the step 25 corresponding to the accelerator pedal operation detecting means and the next step 26. At the step 71 corresponding to the braking detecting means, the judgment is made upon whether the braking is being performed with the brake pedal depressed, in accordance with the ON/OFF state of the brake switch signal B. If the braking is not being performed, the control is proceeded to the step 26 at which the same control with that in FIG. 3 is executed. Conversely, if the braking is being carried out, the control is proceeded to the step 24 at which the lock-up releasing command is anyhow issued. The step 24, therefore, corresponds to the lock-up forced releasing means in this embodiment.

Figure 16:
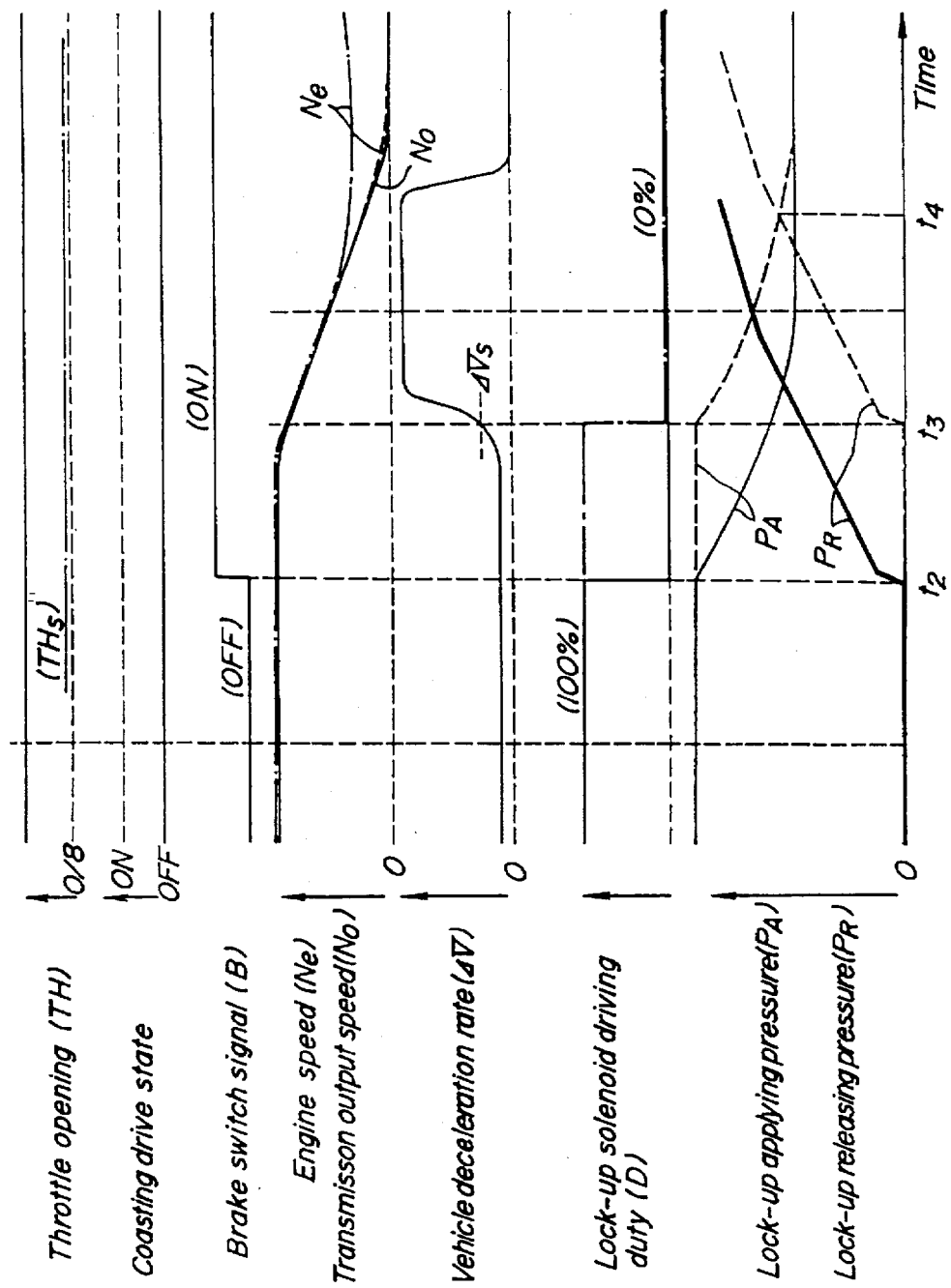
FIG. 16 is a time chart showing the operation of the embodiment illustrated in FIG. 15.

With such a control, the lock-up applying pressure $P_A$ decreases as indicated by the solid line in FIG. 16 while the lock-up releasing pressure $P_R$ increases as indicated by another solid line at the moment $t_2$ of the abnormal operation in which the brake pedal is depressed while putting on the accelerator pedal, and the lock-up releasing moment where the lines of these pressures intersect can be advanced with reference to the moment $t_4$. Therefore, the lock-up release becomes possible at the time which is not so delayed from the moment $t_3$ at which the vehicle deceleration rate $\Delta V$ is above $\Delta Vs$, even during the abnormal operation in which the brake pedal is depressed while putting on the accelerator pedal, and the engine stalling can be prevented from being generated as apparent from the change with elapse indicated by the single-dotted line of the engine speed Ne.

Since the control for reducing the lock-up clutch application capacity to be carried out during the coasting drive in the respective embodiments is forwarded by repeating the decrease in the lock-up applying pressure $P_A$ and the increase in the lock-up releasing pressure $P_R$, the progress of this control can not help being delayed as apparent from a variation in the lock-up clutch application capacity from the moment $t_1$ at which the coasting drive starts to the moment $t_2$ of the sudden deceleration. In the case of the operation carried out during the short time from the moment $t_1$ of the coasting drive start to the moment $t_2$ of the sudden deceleration, the lock-up release command is issued before the the lock-up clutch application capacity is lowered to a target capacity for the coasting drive corresponding with the lock- up solenoid driving duty D=Dc %. Thus, the lock-up release is delayed with respect to the sudden deceleration and the effects intended in the respective embodiments may not be sufficiently attained.

Figure 17:
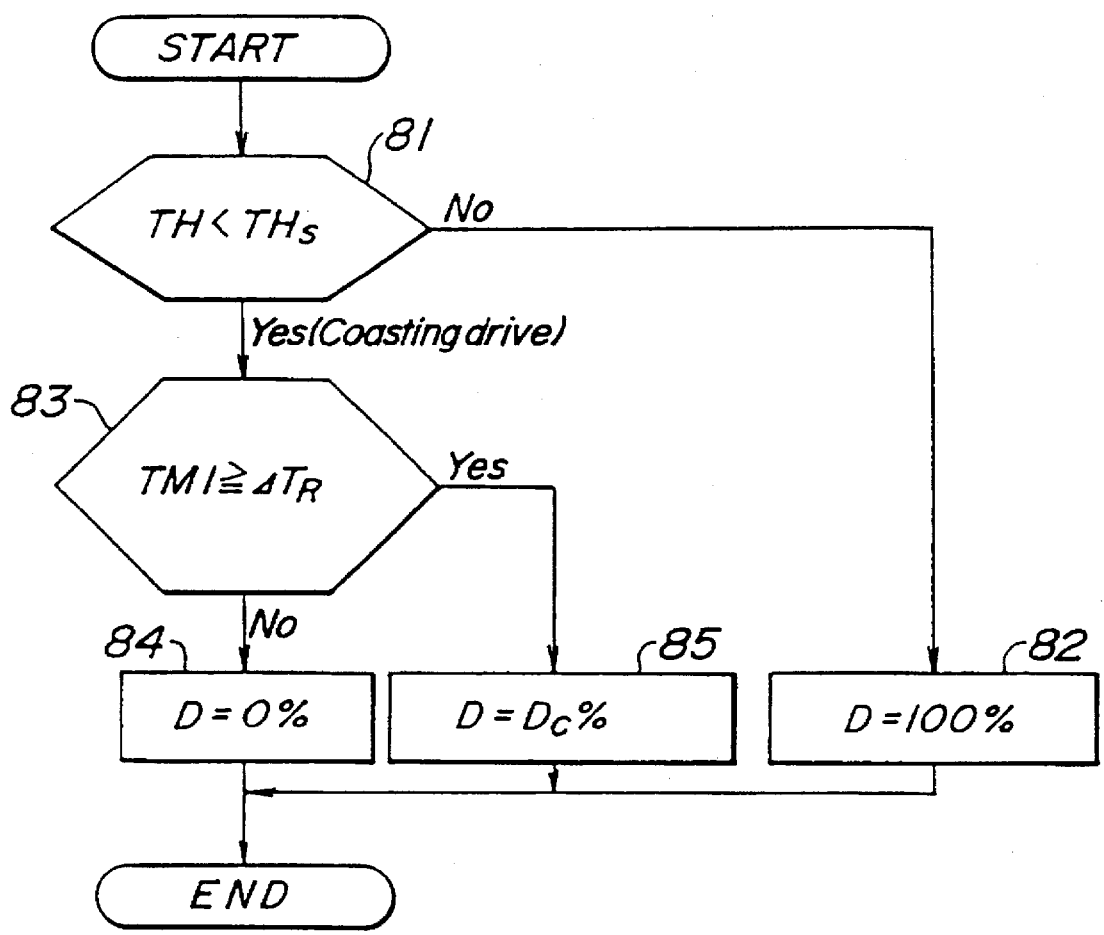
FIG. 17 is a flowchart showing a primary part of a modified embodiment according to present invention.

FIG. 17 shows an embodiment for eliminating such a potential problem, wherein there is only illustrated the content of execution of the control program before the vehicle is subjected to a sudden deceleration by the braking operation when the torque converter is in the lock-up state. At the step 81, the judgment is first made upon whether the coasting drive is being carried out in accordance with the fact that the throttle opening TH is below the predetermined opening THs or not, and if the coasting drive is not being performed, the driving duty D=100% is maintained to keep the lock-up state at the step 82.

Figure 19:
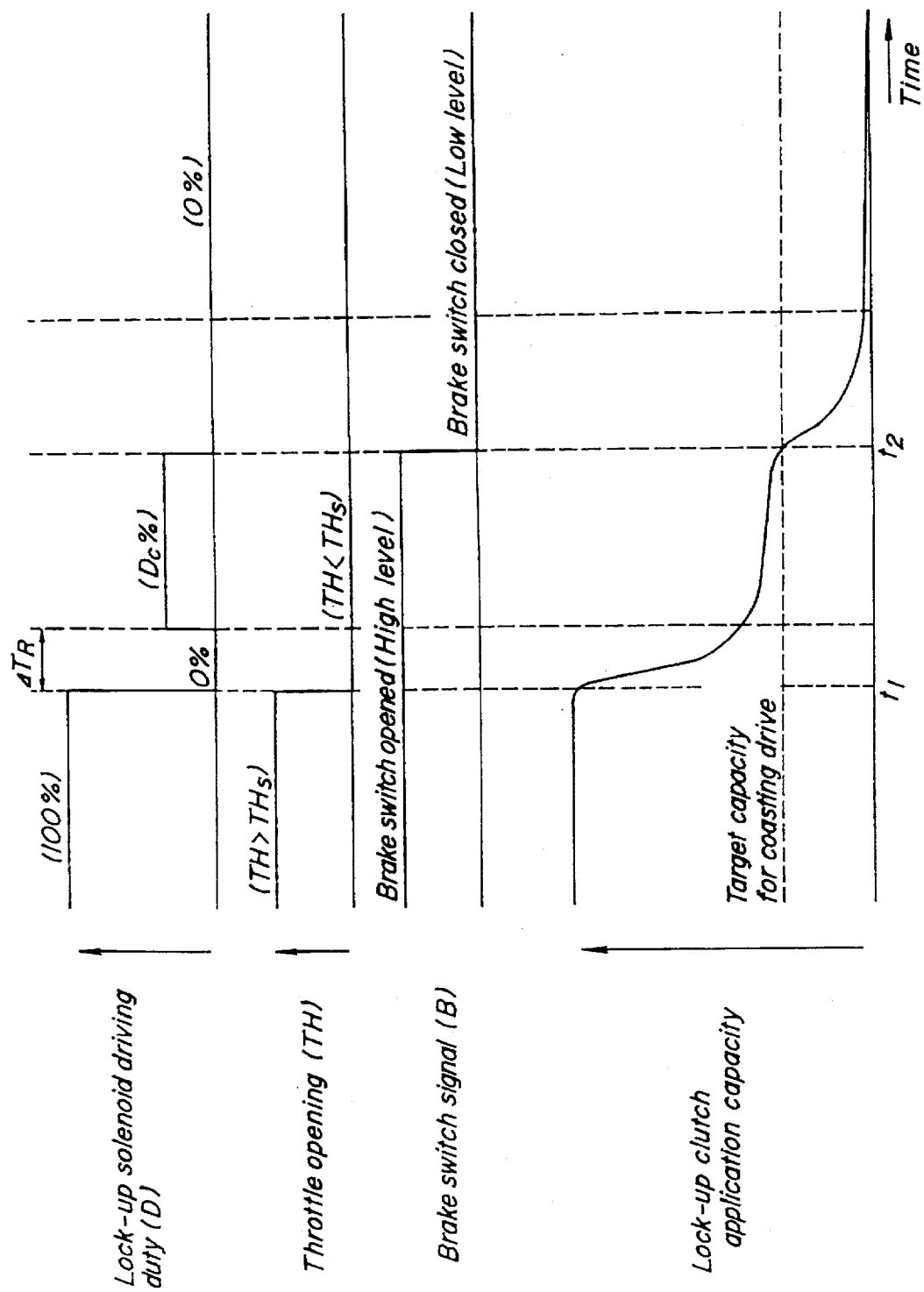
FIG. 19 is a time chart showing the operation of the embodiment illustrated in FIG. 17.
Figure 20:
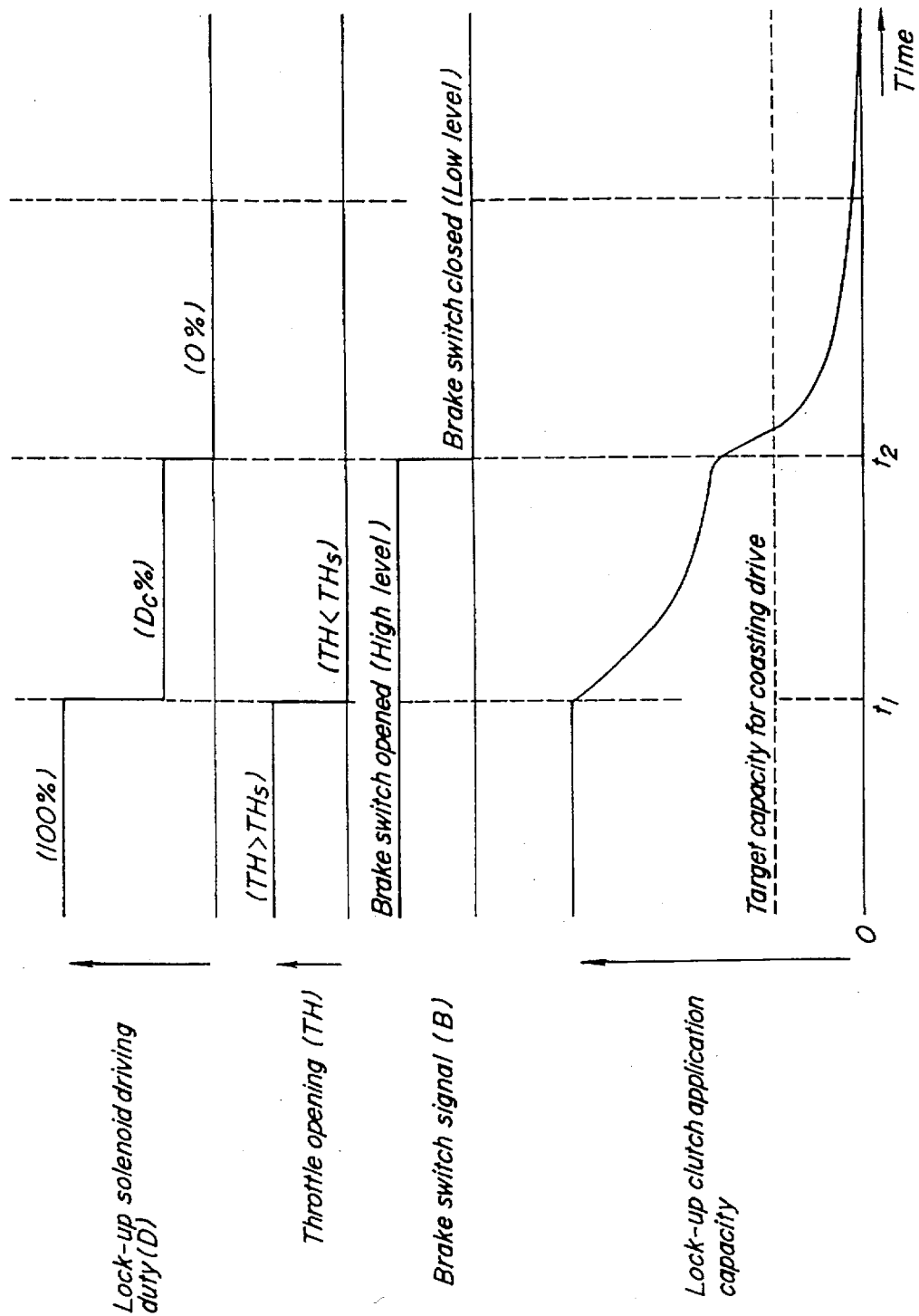
FIG. 20 is a time chart used for explaining inconveniences which may be caused when modification of FIG. 17
Figure 23:
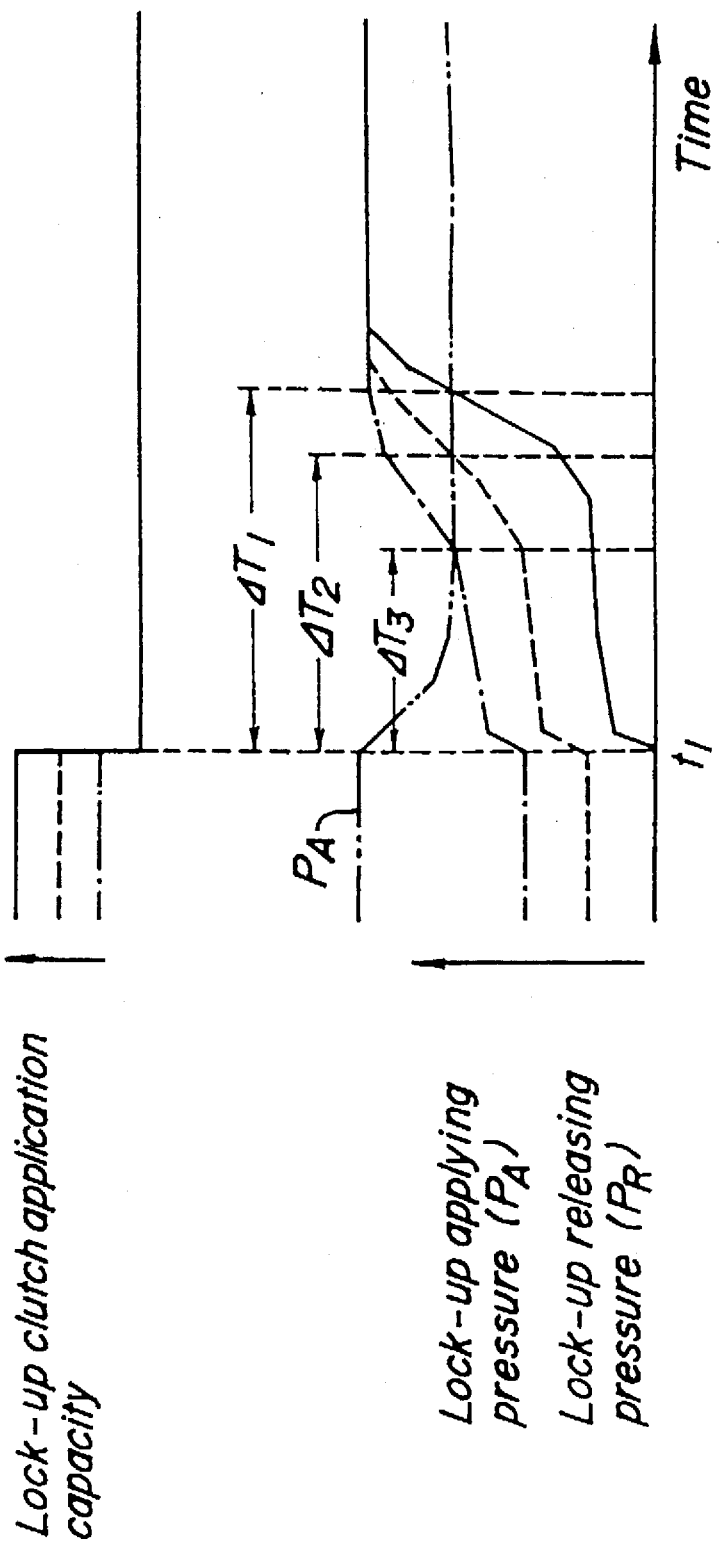
FIG. 23 is a time chart showing the relationship between the lock-up clutch application capacity and the response delay of the lock-up release.

If the coasting drive is being carried out, a timer TM1 for measuring the elapse after the transition to the coasting drive judges on whether it is the minute predetermined time indicated by $\Delta T_R$ in FIG. 19 at the step 83. As shown in FIG. 19, the driving duty D is set to 0% corresponding to the lock-up release at the step 84 in a period during which the predetermined time $\Delta T_R$ passes after the moment $t_1$ of the coasting drive. The driving duty D is then set to Dc % obtained in the similar manner in the respective embodiments at the step 84. With this control, the lock-up clutch application capacity can be rapidly reduced to a target capacity for the coasting drive corresponding with D=Dc % by the sudden deceleration operation of the driving duty during the minute predetermined time $\Delta T_R$ as shown in FIG. 19. Thus, it is possible to eliminate such an event that the lock-up clutch application capacity is not lowered to the target capacity for the coasting drive corresponding with D=Dc % at the time of lock-up release command respondent to this sudden deceleration even when the sudden deceleration is carried out at the moment $t_2$ immediately after the moment $t_1$ of the start of the coasting drive. It is therefore possible to solve a problem that the lock-up release is delayed with respect to the sudden deceleration and the effects intended by the present invention may not be sufficiently achieved.

Figure 18:
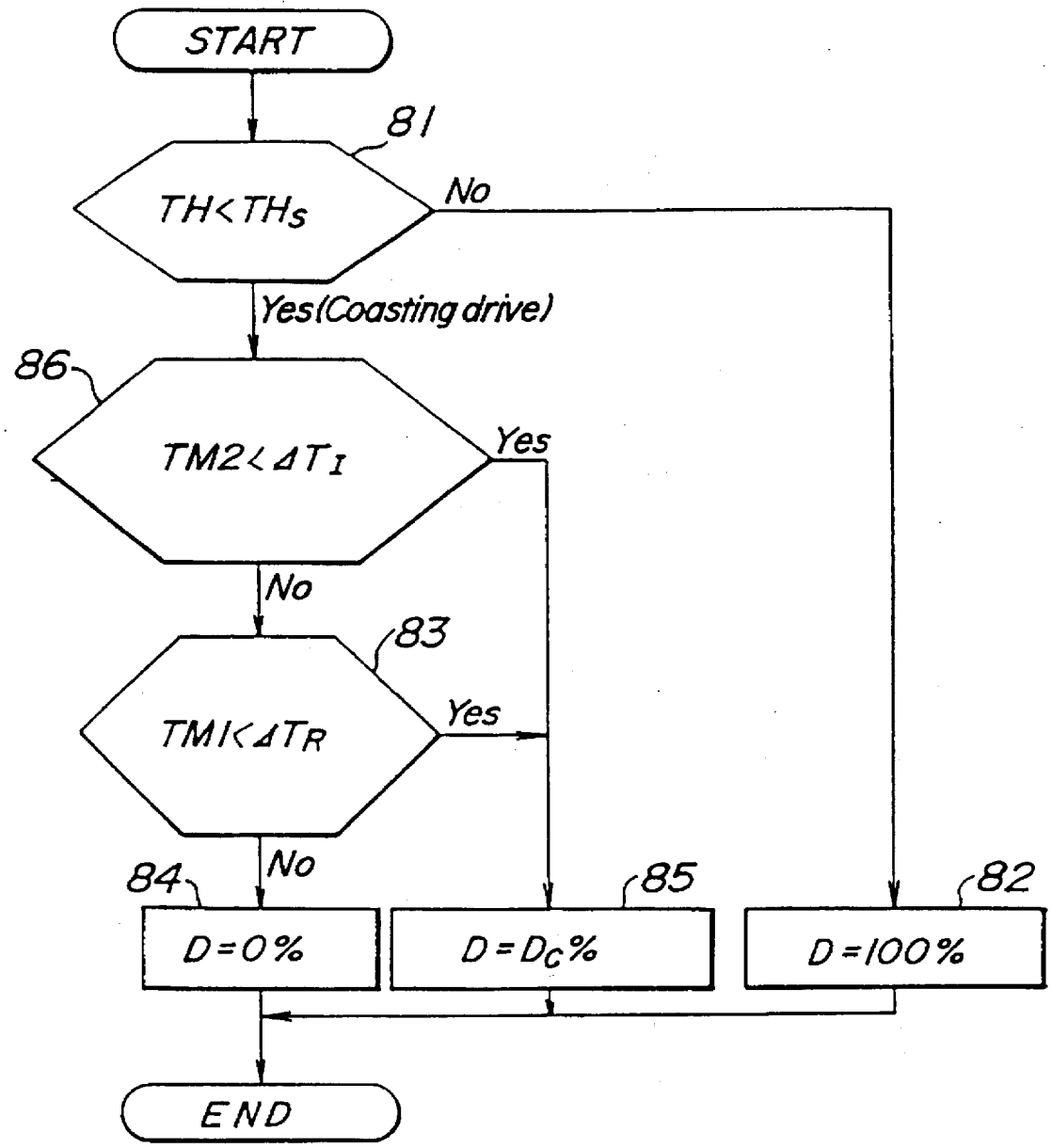
FIG. 18 is a flowchart showing a primary part of another modified embodiment according to the present invention.

FIG. 18 shows a modified embodiment based on that of FIG. 17, wherein the step 86 corresponding to the timer means is inserted between the steps 81 and 83 and the judgment is made upon whether or not a time TM2 from the completion of the coasting drive lock-up clutch application capacity control at the step 85 to the moment of the transition to the next coasting drive is below a predetermined time $\Delta T_f$. If TM2≧$\Delta T_f$, the control is proceeded to the step 83 and the same control with that described in connection with FIG. 17 is carried out. Conversely, if TM2<$\Delta T_f$, the control is advanced to the step 85 and the driving duty sudden deceleration operation during the minute predetermined time $\Delta T_R$ is not performed at the step 84.

This is because the lock-up clutch application capacity is not recovered and still small if TM2<$\Delta T_f$, and when the driving duty sudden deceleration operation during the minute predetermined time $\Delta T_R$ is carried out, the extreme reduction in the lock-up clutch application capacity leads to a tendency to deteriorate the fuel consumption.

Although the driving duty sudden deceleration operation during the minute predetermined time $\Delta T_R$ is not effected if TM2<$\Delta T_f$, the minute predetermined time $\Delta T_R$ may be shortened as the TM2 becomes shorter than $\Delta T_f$, and in this case, it is preferable because the control more suitable for the actual situation is carried out. When TM2 becomes shorter to some extent, it is ultimately determined that $\Delta T_R$=0 is set and the driving duty sudden deceleration operation during the minute predetermined time $\Delta T_R$ is not performed.

It will be readily appreciated from the foregoing detailed description that the present invention provides an improved lock-up control apparatus for automatic transmission, which is capable of effectively preventing the engine from stalling while simultaneously maintaining an improved fuel economy achieved by the fuel cut.

It should be noted that the above-described specific embodiments have been presented by way of examples only, and various modifications and variations may be made without departing from the scope of the invention as defined by the appended claims.

We claim:

1. A lock-up control apparatus for an automatic transmission, including a torque converter which can be turned into a lock-up state by a lock-up clutch so that input and output elements of the torque converter are directly connected with each other, comprising:

a coasting drive detecting means for detecting a coasting drive including a deceleration operation of a vehicle;

a sudden deceleration detecting means for detecting a large deceleration rate above a predetermined value of the vehicle; and a coasting drive lock-up capacity controlling means for controlling an application capacity of the lock-up clutch to a minimum application capacity within such a range that a relative rotation is not generated between the input and output elements of the torque converter in a period when the deceleration rate of the vehicle is below the predetermined value during the coasting drive, in response to signals from both the detecting means, wherein the coasting drive lock-up capacity controlling means comprises:

a reverse driving torque detecting means for detecting a reverse driving torque of an engine in a forward speed of the automatic transmission; and a coasting drive lock-capacity operating means for calculating a minimum application capacity of the lock-up clutch within such a range that the relative rotation is not generated between the input and output elements of the torque converter from the reverse driving torque detected by the reverse driving torque detecting means, thereby controlling the application capacity of the lock-up clutch by a command value corresponding with the application capacity calculated by the coasting drive lock-up capacity operating means.

2. A lock-up control apparatus as set forth in claim 1, wherein the lock-up control apparatus further comprises:

a torque converter slip detecting means for detecting whether the relative rotation between the input and output elements of the torque converter is generated during the control of the application capacity; and a coasting drive lock-up capacity command value varying means for varying the command value so that the relative rotation between the input and output elements of the torque converter is not generated when the relative rotation between the input and output elements of the torque converter is generated in response to a signal from the torque converter slip detecting means.

3. A lock-up control apparatus as set forth in claim 1, wherein the reverse driving torque detecting means retrieves and obtains a reverse driving torque of the engine from a number of revolutions of the engine on the basis of a prearranged map.

4. A lock-up control apparatus as set forth in claim 1, wherein the reverse driving torque detecting means corrects a reverse driving torque detected value of the engine by an amount of increase/decrease in the torque by an auxiliary to be driven by the engine in accordance with an operation/non-operation of the auxiliary.

5. A lock-up control apparatus as set forth in claim 1, wherein the reverse driving torque detecting means corrects a reverse driving torque detection value of the engine in accordance with a coolant temperature of the engine.

6. A lock-up control apparatus for an automatic transmission, including a torque converter which can be turned into a lock-up state by a lock-up clutch so that input and output elements of the torque converter are directly connected with each other, comprising:

a coasting drive detecting means for detecting a coasting drive including a deceleration operation of the vehicle;

a sudden deceleration detecting means for detecting a large deceleration rate above a predetermined value of the vehicle;

a coasting drive lock-up capacity controlling means for controlling an application capacity of the lock-up clutch to a minimum application capacity within such a range that a relative rotation is not generated between the input and output elements of the torque converter in a period when the deceleration rate of the vehicle is below the predetermined value during the coasting drive, in response to signals from both the detecting means;

a braking detecting means for detecting a braking of the vehicle;

an accelerator operation detecting means for detecting the application of an accelerator pedal of the vehicle; and a lock-up forced releasing means for forcedly releasing the lock-up clutch when the braking and the application of the accelerator pedal are simultaneously detected by the braking detecting means and the accelerator operation detecting means.

7. A lock-up control apparatus for an automatic transmission, including a torque converter which can be turned into a lock-up state by a lock-up clutch so that input and output elements of the torque converter are directly connected with each other, comprising:

a coasting drive detecting means for detecting a coasting drive including a deceleration operation of the vehicle;

a sudden deceleration detecting means for detecting a large deceleration rate above a predetermined value of the vehicle; and a coasting drive lock-up capacity controlling means for controlling an application capacity of the lock-up clutch to a minimum application capacity within such a range that a relative rotation is not generated between the input and output elements of the torque converter in a period when the deceleration rate of the vehicle is below the predetermined value during the coasting drive, in response to signals from both the detecting means, wherein the coasting drive lock-up capacity controlling means has a structure such that the application capacity of the lock-up clutch is controlled by a prearranged command value and the prearranged command value is set to a value corresponding with the release of the lock-up clutch during a predetermined time after the transition to the coasting drive of the vehicle is detected by the coasting drive detecting means.

8. A lock-up control apparatus as set forth in claim 7, further comprising a timer means for measuring a time from a completion of the controlling by the coasting drive lock-up capacity control means to a next coasting drive, thereby shortening the predetermined time until which the command value is set to a value corresponding with the release of the lock-up clutch as the time measured by the timer means is shortened.

* * * * *